US011902802B2

(12) United States Patent
Bai et al.

(10) Patent No.: US 11,902,802 B2
(45) Date of Patent: Feb. 13, 2024

(54) COMBINED BEAM SWEEPING PROCEDURE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/499,818

(22) Filed: Oct. 12, 2021

(65) Prior Publication Data

US 2022/0141677 A1 May 5, 2022

Related U.S. Application Data

(60) Provisional application No. 63/110,249, filed on Nov. 5, 2020.

(51) Int. Cl.
*H04W 16/28* (2009.01)
*H04L 5/00* (2006.01)
*H04B 7/06* (2006.01)

(52) U.S. Cl.
CPC .......... *H04W 16/28* (2013.01); *H04B 7/0626* (2013.01); *H04L 5/0051* (2013.01)

(58) Field of Classification Search
CPC ..... H04B 7/0626; H04L 5/0051; H04W 16/28
See application file for complete search history.

(56) References Cited

U.S. PATENT DOCUMENTS

| | | | | |
|---|---|---|---|---|
| 10,952,231 | B2* | 3/2021 | Liou | H04W 72/046 |
| 2018/0006706 | A1* | 1/2018 | Cheng | H04W 72/23 |
| 2018/0054745 | A1* | 2/2018 | Wu | H04W 72/1273 |
| 2018/0219600 | A1* | 8/2018 | Kim | H04B 7/0626 |
| 2020/0288479 | A1* | 9/2020 | Xi | H04W 24/08 |
| 2021/0143870 | A1* | 5/2021 | Faxér | H04L 5/0057 |
| 2021/0227409 | A1* | 7/2021 | Siomina | H04B 7/0617 |
| 2021/0321373 | A1* | 10/2021 | Rahman | H04L 5/0096 |
| 2022/0201504 | A1* | 6/2022 | Fujimura | H04B 7/088 |

* cited by examiner

*Primary Examiner* — Fahmida S Chowdhury
(74) *Attorney, Agent, or Firm* — Holland & Hart LLP

(57) ABSTRACT

Methods, systems, and devices for wireless communications are described. In some examples, a base station may transmit, to a user equipment (UE), configuration information for both a first set of reference signals for a first beam sweeping procedure and a second set of reference signals for a second beam sweeping procedure. The UE may receive the first set of reference signals according to the configuration information, and may transmit a channel state information (CSI) report to the base station based on the received reference signals. After transmitting the CSI report, both the base station and the UE may autonomously update a transmission configuration indicator (TCI) state based on the CSI report (e.g., using a preferred transmit beam indicated in the CSI report). The base station may transmit on the preferred transmit beam, and the UE may receive on various candidate receive beams, the second set of reference signals.

30 Claims, 17 Drawing Sheets

COMBINED BEAM SWEEPING PROCEDURE

CROSS REFERENCE

The present Application for Patent claims the benefit of U.S. Provisional Patent Application No. 63/110,249 by BAI et al., entitled "COMBINED BEAM SWEEPING PROCEDURE," filed Nov. 5, 2020, assigned to the assignee hereof, and expressly incorporated by reference herein.

FIELD OF TECHNOLOGY

The following relates to wireless communications, including combined beam sweeping procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, base stations and UEs may perform beam sweeping procedures to identify transmit and receive beams on which to communicate.

SUMMARY

The described techniques relate to improved methods, systems, devices, and apparatuses that support combined beam sweeping procedure. Generally, the described techniques provide for a base station transmitting, to a user equipment (UE), configuration information for both a first set of reference signals for a first beam sweeping procedure and a second set of reference signals for a second beam sweeping procedure. The UE may receive the first set of reference signals and transmit a channel state information (CSI) report based on the received configuration information. After transmitting the CSI report, both the base station and the UE may autonomously update a transmission configuration indicator (TCI) state based on the CSI report (e.g., using a preferred transmit beam indicated in the CSI report). The base station may transmit on the preferred transmit beam, and the UE may receive on various candidate receive beams, the second set of reference signals. In some examples, the UE may wait for a predetermined or standardized amount of time after transmitting the CSI report, for a reconfiguration message. If a reconfiguration message is received, then the UE may use an indicated TCI state for receiving the second set of reference signals. Otherwise, the UE may monitor for and receive the second set of reference signals according to the previously received configuration information and the TCI state associated with the preferred transmit beam indicated in the CSI report.

DETAILED DESCRIPTION

Figure 1:
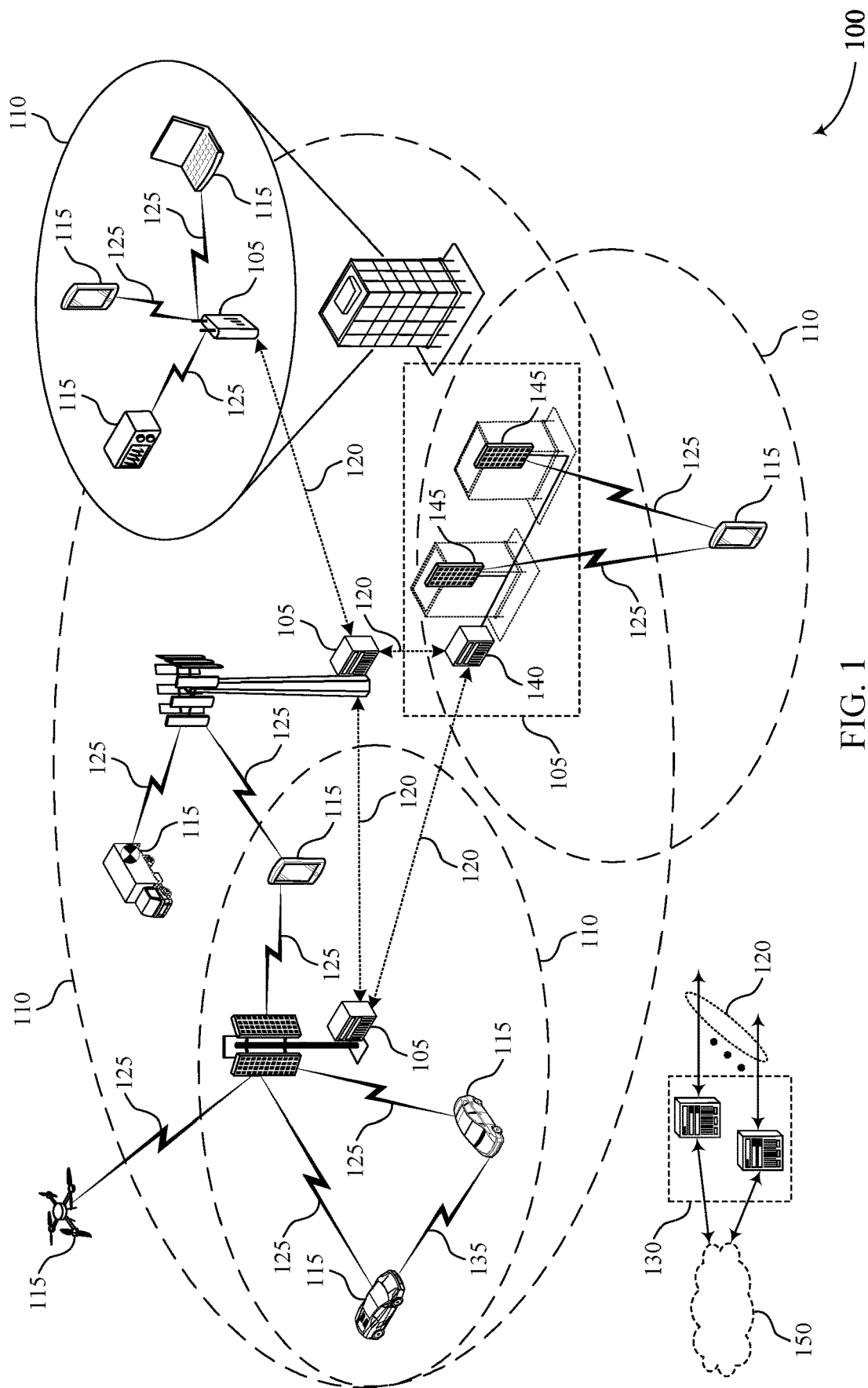
FIG. 1 illustrates an example of a wireless communications system that supports combined beam sweeping procedure in accordance with aspects of the present disclosure.

In some wireless communications systems, base stations and user equipments (UEs) may perform multiple phases of beam sweeping procedures to identify beam pairs (e.g., a transmit beam and a receive beam on which to communicate with each other). In a first phase of a beam sweeping procedure, a UE and base station may identify a best coarse beam pair based on a coarse beam sweep (e.g., the UE may receive on a coarse beam, while the base station sweeps through several beams carrying synchronization signal blocks (SSBs)). In a second phase of the beam sweeping procedure, a base station may sweep through a set of refined transmit beams within the same spatial coverage of the selected coarse transmit beam. The UE may receive various reference signals (e.g., channel state information reference signals (CSI-RSs)), one reference signal on each of the refined transmit beams, using the same coarse receive beam.

The UE may transmit a channel state information (CSI) report based on the received reference signals, from which the base station may identify a preferred or best refined transmit beam. In a third phase of the procedure, the UE may receive another set of reference signals. The base station may transmit the set of reference signals over time on the preferred refined transmit beam. The UE may receive the various reference signals on different candidate refined receive beams, and may select a best or preferred receive beam based on one or more measurement on the received reference signals.

In some examples, such multi-phase beam sweeping procedures may result in a high signaling and computational overhead, as well as extended time delays. For instance, after the first phase of the procedure, the base station may transmit configuration information for the second phase reference signals, a grant for the second-phase beam sweeping, or both. Then, the base station may transmit the reference signals for the second-phase beam sweeping. After the second-phase beam sweeping, the UE may transmit a CSI report indicating a preferred transmit beam. Upon receiving the CSI report, the base station may perform a transmission configuration indicator (TCI) state update, adjusting one or more antennas for transmissions on the preferred transmit beam. However, the UE may be unaware of the updated TCI state. Thus, the base station may transmit a TCI state update message including an indication of an updated TCI state for receiving communications transmitted by the base station on the preferred transmit beam. The base station may transmit configuration information for another set of reference signals, a grant for the set of reference signals, or both, and may then transmit the reference signals on the preferred transmit beam. Such procedures may result in unnecessary power expenditures, inefficient use of computations resources, decreased battery life, increased system latency and communication delays, and decreased user experience.

In some examples, a base station may transmit a single grant triggering both the second-phase beam sweeping procedure and the third-phase beam sweeping procedure. The base station may transmit configuration information for both the first set of reference signals and the second set of reference signals. The UE may receive the first set of reference signals based on the received configuration information and grant, and may transmit a CSI report to the base station. After the base station receives the CSI report, both the base station and the UE may autonomously update a TCI state based on the CSI report (e.g., may adjust or reconfigure one or more antennas to point in the direction of the preferred transmit beam indicated in the CSI report). The base station may transmit, on the preferred transmit beam, the second set of reference signals. The UE may receive the second set of reference signals on various candidate refined receive beams. In some examples, the UE may wait for a predetermined or standardized amount of time after transmitting the CSI report, for a reconfiguration message. If a reconfiguration message is received, then the UE may use an indicated TCI state for receiving the second set of reference signals. Otherwise, upon expiration of the predetermined amount of time, the UE may monitor for and receive the second set of reference signals according to the previously received configuration information and the preferred transmit beam indicated in the CSI report. The UE may then identify a preferred refined receive beam based on the received reference signals.

Particular aspects of the subject matter described herein may be implemented to realize one or more advantages. The described techniques may support improvements in system efficiency such that a device may decrease unnecessary signaling and processing overhead, and unnecessary time delays. By combining multiple signals into single signals (e.g., configuration information, grants, etc.), a device may not have to receive, decode, and process, or prepare, encode, and transmit, excessive or unnecessary signals. Additionally, by autonomously selecting and updating a TCI state (e.g., based on a preferred beam indicated in a CSI report), a UE and a base station may more quickly and accurately (e.g., and without relying on explicit indications in additional signals) update a TCI state and be prepared for a next phase of a beam sweeping procedure.

Aspects of the disclosure are initially described in the context of wireless communications systems. Aspects of the disclosure are further illustrated by and described with reference to process flows and device architectures. Aspects of the disclosure are further illustrated by and described with reference to apparatus diagrams, system diagrams, and flowcharts that relate to combined beam sweeping procedure.

FIG. 1 illustrates an example of a wireless communications system 100 that supports combined beam sweeping procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit, to a UE 115, configuration information for both a first set of reference signals for a first beam sweeping procedure and a second set of reference signals for a second beam sweeping procedure. The UE 115 may receive the first set of reference signals according to the configuration information, and may transmit a CSI report to the base station 105 based on the received reference signals. After transmitting the CSI report, both the base station 105 and the UE 115 may autonomously update a TCI state based on the CSI report (e.g., using a preferred transmit beam indicated in the CSI report). The base station 105 may transmit on the preferred transmit beam, and the UE 115 may receive on various candidate receive beams, the second set of reference signals.

Figure 2A:
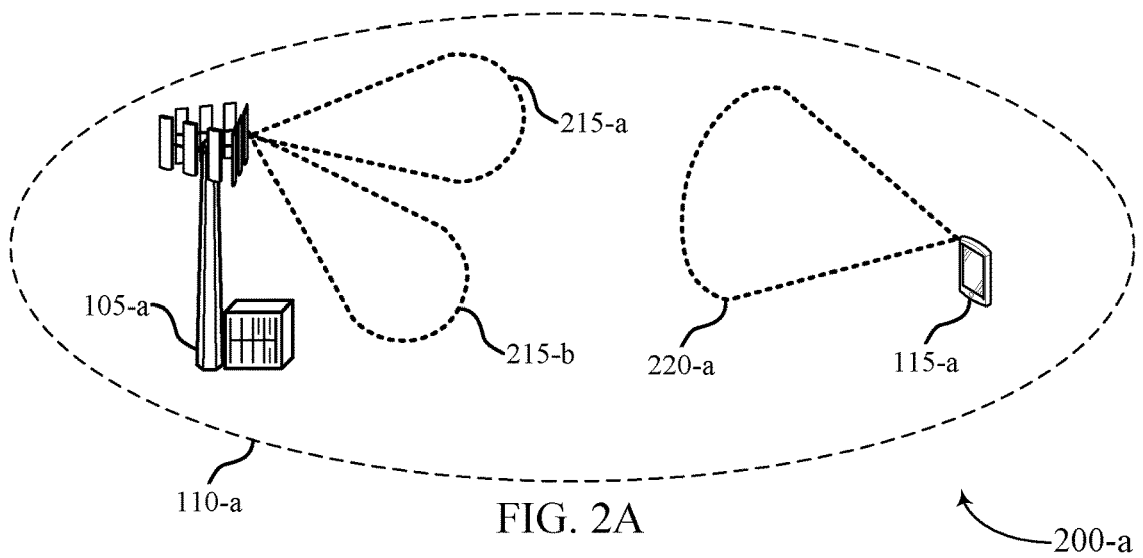
FIG. 2A illustrates an example of a wireless communications system that supports combined beam sweeping procedure in accordance with aspects of the present disclosure.
Figure 2B:
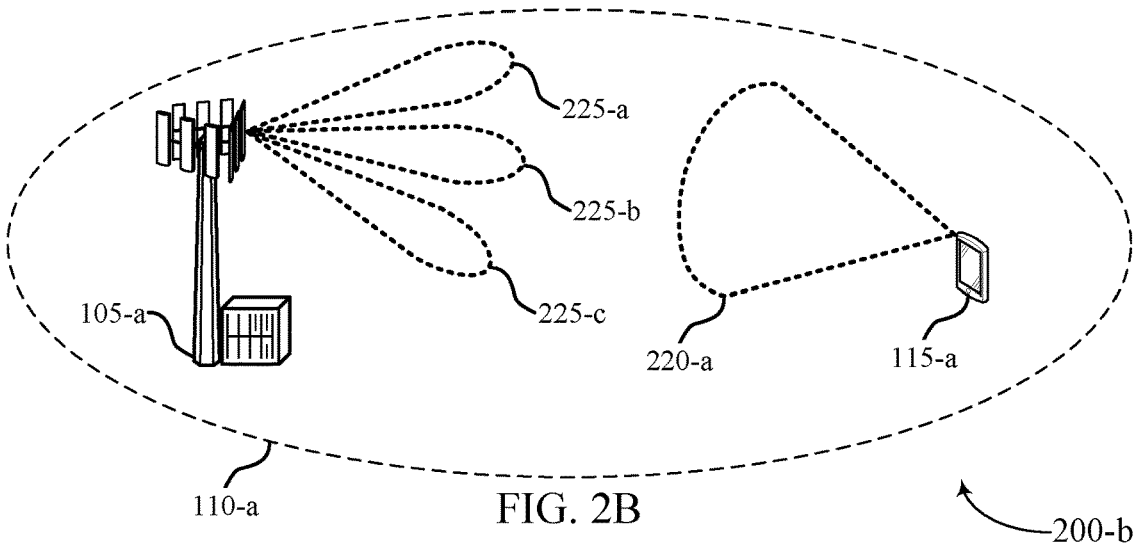
FIG. 2B illustrates an example of a wireless communications system that supports combined beam sweeping procedure in accordance with aspects of the present disclosure.
Figure 2C:
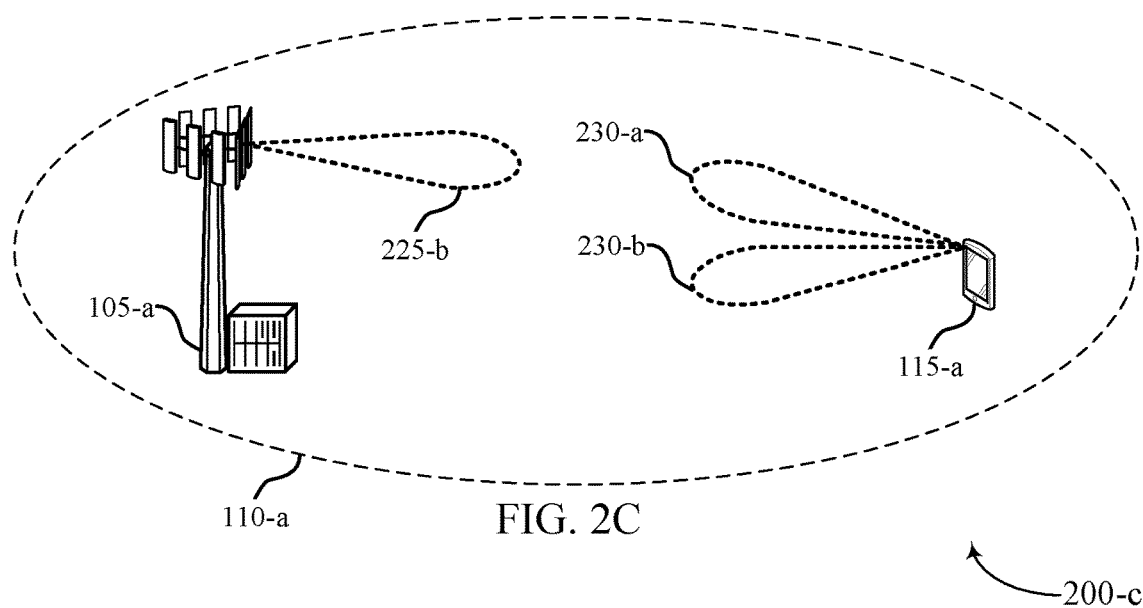
FIG. 2C illustrates an example of a wireless communications system that supports combined beam sweeping procedure in accordance with aspects of the present disclosure.

FIGS. 2A, 2B, and 2C illustrate examples of a wireless communications system 200 that supports combined beam sweeping procedure in accordance with aspects of the present disclosure. Wireless communications system 200 may include a base station 105-a that services one or more UEs 115 (e.g., UE 115-a) located within geographic coverage area 110-a. Base station 105-a and UE 115-a may perform a multi-phase beam sweeping procedure to identify one or more beams on which to communicate. For instance, FIG. 2A illustrates a first phase of a beam sweeping procedure in wireless communications system 200-a, FIG. 2B illustrates a second phase of the beam sweeping procedure in wireless communications system 200-b, and FIG. 2C illustrates a third phase of the beam sweeping procedure in wireless communications system 200-c.

As illustrated with reference to FIG. 2A, base station 105-a and UE 115-a may identify a best beam pair on which to communicate based on a coarse beam sweep. For instance, Base station 105-a may transmit one or more synchronization signal blocks (SSBs) on one or more coarse transmit beams 215 (e.g., a first SSB on coarse transmit beam 215-a and a second SSB on coarse transmit beam 215-b). UE 115-a may receive one or more of the SSBs on one or more coarse receive beams 220 (e.g., coarse receive beam 220-a). UE 115-a may determine a preferred or best coarse transmit beam 215. For instance, UE 115-a may perform one or more channel quality measurements on the received SSBs, and may indicate which of the coarse transmit beams 215 is a preferred beam (e.g., in an uplink report message, or by selecting a random access message resource associated with the preferred coarse transmit beam 215). For example, Base station 105-a and UE 115-a may identify coarse transmit beam 215-a as a preferred coarse transmit beam, and coarse receive beam 220-a as a preferred coarse receive beam. UE 115-a and base station 105-a may further refine the preferred beams as described in greater detail with reference to FIGS. 2B and 2C, and may more efficiently perform beam sweeping procedures as described with reference to FIG. 4.

As illustrated with reference to FIG. 2B, base station 105-a may identify a preferred refined transmit beam 225. Base station 105-a may refine the preferred coarse transmit beam 215-a into multiple refined transmit beams 225 (e.g., each refined transmit beam 225 may at least partially overlap in special resources with coarse transmit beam 215-a). Base station 105-a may transmit one or more reference signals (e.g., SSBs, CSI-RSs, or the like) on multiple refined transmit beams 225. For instance, base station 105-a may transmit a first CSI-RS on refined transmit beam 225-a, a second CSI-RS on refined transmit beam 225-b, and a third CSI-RS on refined transmit beam 225-c). UE 115-a may receive the various CSI-RSs, perform one or more measurements on the received CSI-RSs, and transmit a CSI report to base station 105-a. The CSI report may include one or more best or preferred refined transmit beams 225. For instance, UE 115-a may determine, based on the measurements, that refined transmit beam 225-b is a preferred transmit beam (e.g., has a higher reference signal receive power (RSRP) value, a higher reference signal receive quality (RSRQ) value, a least amount of measured interference, or the like), and may include an indication of refined transmit beam 225-b in the CSI report. UE 115-a may then select a refined receive beam 230 based on the preferred refined transmit beam 225-b as described in greater detail with reference to FIG. 105-a. Base station 105-a and UE 115-a may also perform more efficient, power-saving, and faster beam sweeping procedures, as described with reference to FIG. 4.

As illustrated with reference to FIG. 2C, UE 115-a may identify a preferred refined receive beam 230. Base station 105-a may transmit one or more reference signals (e.g., CSI-RSs, which may be a different set of CSI-RSs, or repetitions of the CSI-RSs transmitted via refined transmit beams 225 as illustrated with reference to FIG. 2B), on preferred transmit beam 225-*b*. For instance, base station 105-*a* may transmit a first CSI-RS at a first time on preferred transmit beam 225-*b*, and may transmit a second CSI-RS at a second time on preferred transmit beam 225-*b*. UE 115-*a* may receive the first CSI-RS on refined receive beam 230-*a*, and may receive the second CSI-RS on refined receive beam 230-*b*. UE 115-*a* may perform one or more measurements on the received CSI-RSs, and may identify which refined receive beam 230 is preferred. For instance, UE 115-*a* may determine that the CSI-RS received on refined receive beam 230-*a* has a higher measured RSRP or RSRQ, a lowest level of measured interference, or the like, and may thus identify refined receive beam 230-*a* as the preferred receive beam. Base station 105-*a* and UE 115-*a* may then procedure to communicate using transmit beam 225-*b* and receive beam 230-*a*.

In some examples, the procedure described with reference to FIGS. 2A, 2B, and 2C may result in unnecessary signaling overhead, power expenditures, and time delays, as described in greater detail with reference to FIG. 3. However, in some examples, UE 115-*a* and base station 105-*b* may autonomously update one or more TCI states to increase the efficiency of the procedure, decrease time delays, and improve user experience, as described in greater detail with reference to FIGS. 3 and 4.

Figure 3:
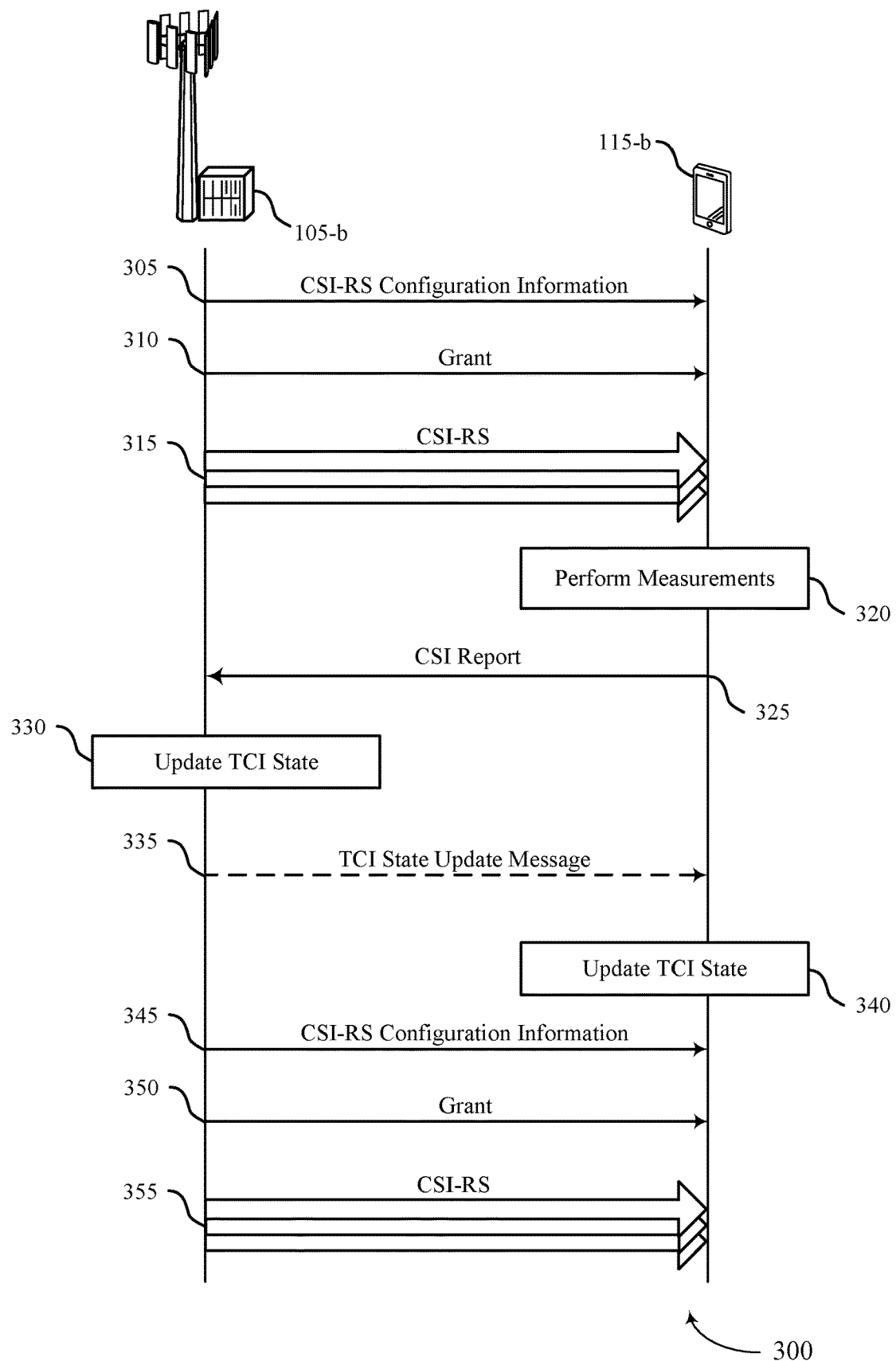
FIG. 3 illustrates an example of a process flow that supports combined beam sweeping procedure in accordance with aspects of the present disclosure.

FIG. 3 illustrates an example of a process flow 300 that supports combined beam sweeping procedure in accordance with aspects of the present disclosure. Process flow 300 may include a base station 105-*b* and a UE 115-*b*, which may be corresponding examples of devices described with reference to FIGS. 1, 2A, 2B, and 2C. UE 115-*b* and base station 105-*b* may perform a multi-phase beam sweeping procedure. For instance, base station 105-*b* and UE 115-*b* may perform a first phase (e.g., P1) beam sweeping procedure to identify a coarse beam pair (e.g., a coarse transmit beam and a coarse receive beam) on which to communicate, as described with reference to FIG. 2A. Base station 105-*b* and UE 115-*b* may perform a second phase (e.g., P2) beam sweeping procedure to identify a refined transmit beam for base station 105-*b*, as described with reference to FIG. 2B, and may further perform a third phase (e.g., P3) beam sweeping procedure to identify a receive beam for UE 115-*b*. Prior to 305, base station 105-*b* and UE 115-*b* may perform a P1 beam sweeping procedure.

At 305, base station 105-*b* may transmit CSI-RS configuration information to UE 115-*b* (e.g., for a P2 beam sweeping procedure). The CSI-RS configuration information may include an indication of time resources, frequency resources, spatial resource, or a combination thereof for a set of CSI-RSs to transmit at 315.

At 310, base station 105-*b* may transmit a grant (e.g., a P2 grant) triggering the P2 CSI-RS transmissions at 315.

In some examples, the P2 grant may trigger aperiodic CSI, or may configure periodic or semi-persistent CSI. For example, the P2 grant may be a downlink control information (DCI) message (e.g., aperiodic CSI). In such examples, a single DCI message may carry both the P2 CSI-RS configuration information and the P2 grant, a first DCI message may carry the CSI-RS configuration information, and a second DCI may carry the grant, or base station 105-*b* may configure UE 115-*b* with the CSI-RS configuration information via higher layer signaling (e.g., RRC signaling), and a DCI message at 310 may trigger the previously configured CSI-RS signaling at 315. In some examples, a single DCI message may trigger both the CSI-RSs at 315, and a CSI report at 325.

AT 315, base station 105-*b* may transmit a set of CSI-RSs to UE 115-*b* according to the CSI-RS configuration information. For example, base station 105-*b* may transmit a first CSI-RS on a first refined transmit beam (e.g., a refined beam that partially overlaps with a coarse transmit beam identified in a P1 beam sweeping procedure), a second CSI-RS on a second refined transmit beam, and a third CSI-RS on a third refined transmit beam, etc.

At 320, UE 115-*b* may perform one or more measurements on the CSI-RSs received at 315, and may generate a CSI report for transmission at 325. For instance, UE 115-*b* may measure one or more channel quality metrics (e.g., RSRP, RSRQ, or the like) for each received CSI-RS, and may determine one or more preferred transmit beams (e.g., one or more CSI-RSs associated with a particular refined transmit beam) based on the measurements.

At 325, UE 115-*b* may transmit the CSI report to base station 105-*b*. UE 115-*b* may include, in the CSI report, one or more measurement values associated with the respective transmit beams on which the CSI-RSs were received, an indication of one or more preferred transmit beams based on the measurement values, or a combination thereof.

At 330, base station 105-*b* may update a TCI state in preparation for transmitting downlink signals to UE 115-*b* on a preferred transmit beam. For instance, base station 105-*b* may determine, based on the CSI report, which CSI-RS transmitted at 315 was received by UE 115-*b* with a highest channel quality metric (e.g., a highest RSRP, a highest RSRQ, a least amount of detected interference, or the like). Base station 105-*b* may select the preferred refined transmit beam identified in the CSI report, and may prepare to transmit CSI-RSs at 355 using the preferred transmit beam. For example, base station 105-*b* may adjust one or more antennas, one or more antenna ports, one or more active TCI states, or the like, to transmit the CSI-RSs using the preferred transmit beam.

At 335, base station 105-*b* may transmit a TCI state update message, indicating an updated TCI state. For example, base station 105-*b* may indicate an updated TCI state corresponding to the preferred transmit beam on which base station 105-*b* will transmit the CSI-RSs at 355. The updated TCI state may include an indication of the preferred transmit beam, or one or more spatial parameters for performing a P3 beam sweeping procedure, or a combination thereof.

At 340, UE 115-*b* may update a TCI state (e.g., according to the TCI state update message received at 335). For example, UE 115-*b* may adjust one or more antennas, one or more antenna ports, one or more active TCI states, or the like, to prepare to receive CSI-RSs transmitted at 355 by base station 105-*b* using the preferred transmit beam.

At 345, base station 105-*b* may transmit CSI-RS configuration information to UE 115-*b*. The CSI-RS configuration information may include information for a P3 beam sweeping procedure. The CSI-RS configuration information may include time resources, frequency resources, spatial resources, or a combination thereof for CSI-RSs.

At 350, base station 105-*b* may transmit a grant, triggering the P3 beam sweeping procedure (e.g., triggering transmissions of CSI-RSs at 355).

At 355, base station 105-*b* may transmit CSI-RSs according to the CSI-RS configuration information transmitted at 345. For example, base station 105-*b* may transmit CSI-RSs (e.g., the same CSI-RSs transmitted at 315) to UE 115-b on the preferred transmit beam at different times.

UE 115-b may receive the CSI-RSs based on the updated TCI state configured at 340. UE 115-b may receive the CSI-RSs using different refined receive beams, as illustrated with reference to FIG. 2C. For instance, base station 105-b may transmit a first CSI-RS on the preferred transmit beam at a first time, which UE 115-b may receive on a first refined receive beam. Base station 105-b may transmit a second CSI-RS on the preferred transmit beam at a second time, which UE 115-b may receive on a second refined receive beam, and so forth for any number of refined receive beams. Upon receiving the CSI-RSs, UE 115-b may determine a preferred receive beam (e.g., based on one or more measurements performed on the received CSI-RSs). Subsequently, base station 105-b and UE 115-b may communicate using the preferred transmit beam and the preferred receive beam.

In some examples, base station 105-b may transmit the P2 CSI-RS configuration information (e.g., at 305) and the P3 CSI-RS configuration information (e.g., at 345) prior to receiving the CSI report (e.g., at 325). In such examples, base station 105-b may configure multiple candidate CSI-RS resources (e.g., with repetition on) for all potential beams transmit beams to be used for P3 sweeping at 355. For example, if base station 105-b transmits CSI-RS configuration information for P3 beam sweeping prior to receiving the CSI report at 325, then base station 105-b may be unaware of which of the refined transmit beams used at 315 will be the preferred transmit beam. Base station 105-b would also thus be unaware of which candidate refined receive beams UE 115-b would use for receiving the P3 CSI-RSs at 355. Thus, base station 105-b could provide candidate CSI-RS resources corresponding to various possible transmit beams.

However, such procedures, as described with reference to FIG. 3 may result in excessive computational and signaling overhead. For instance, base station 105-b may provide, and UE 115-b may receive, at least two CSI-RS configurations (e.g., at 305 for P2 and at 345 for P3). Additionally, base station 105-b may provide at least two grants (e.g., at 310 for P2 and at 350 for P3). Additionally, because the P3 configuration may be based on the CSI report, UE 115-b and base station 105-b may experience an unnecessary time delay (e.g., resulting from a scheduling delay for the P3 configuration). Additionally, or alternatively, if base station 105-b configures P3 beam sweeping to occur on a refined beam chosen from the P2 beam sweeping, base station 105-b may first perform a TCI state update or reconfiguration associated with the selected refined beam, which may take some time to take effect, resulting in additional time delays. Similarly, UE 115-b may perform a TCI update or reconfiguration procedure at 340 (e.g., responsive to receiving the TCI state update message), which may result in further time delays and increased signaling overhead. Thus, the procedure described with reference to FIG. 3 may result in increased time delays, increased signaling overhead, increased processing overhead and power expenditures, decreased battery life, increased system overhead, and decreased user experience.

In some examples, as described in greater detail with reference to FIG. 4, UE 115-b and base station 105-b may save time and computational resources, as well as battery life, by combining one or more signals (e.g., combining the CSI-RS configuration information messages, the grants, or both), by autonomously updating TCI states (e.g., based on the CSI report and without a TCI state update message), or both.

Figure 4:
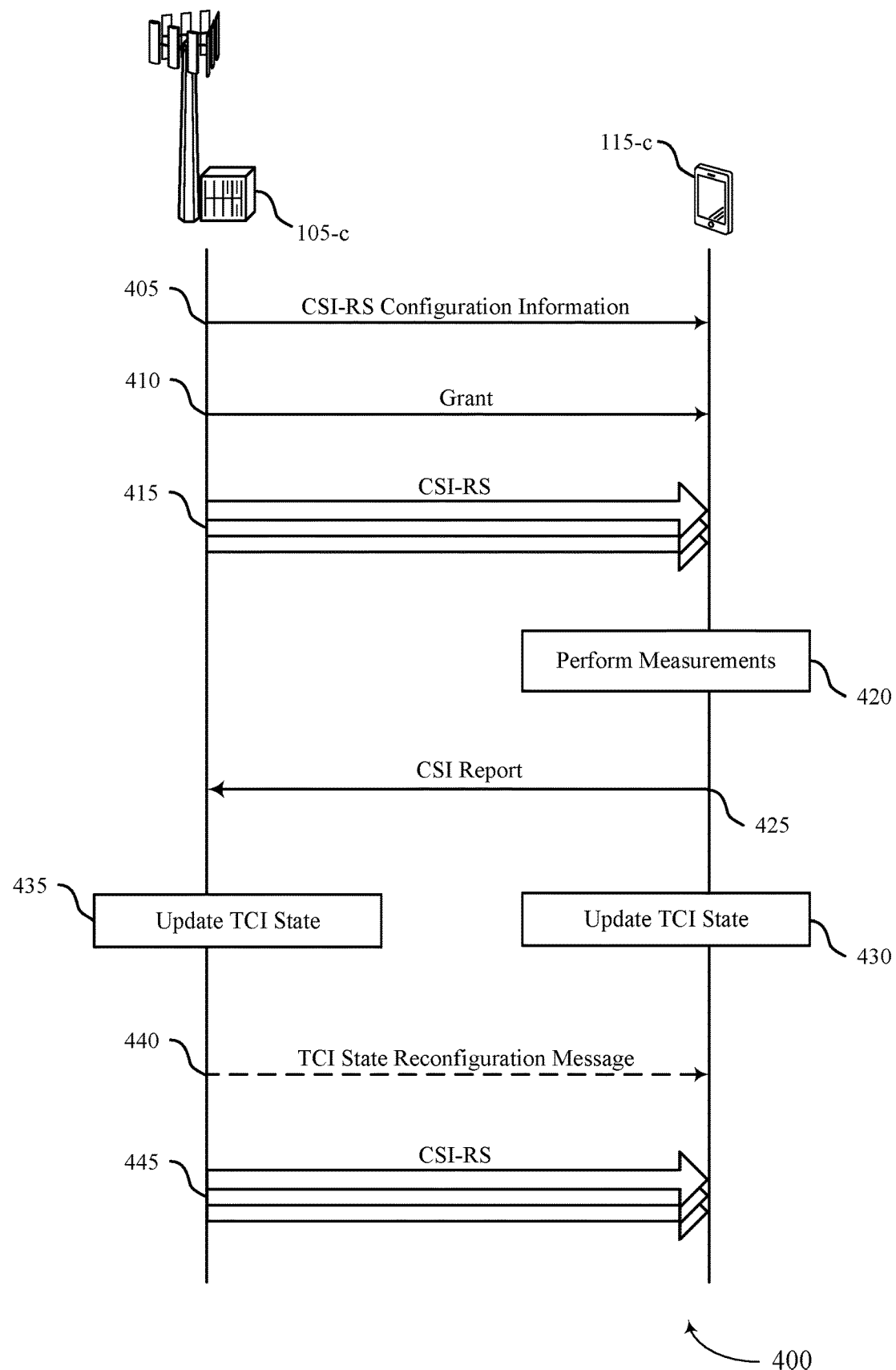
FIG. 4 illustrates an example of a process flow that supports combined beam sweeping procedure in accordance with aspects of the present disclosure.

FIG. 4 illustrates an example of a process flow 400 that supports combined beam sweeping procedure in accordance with aspects of the present disclosure. Process flow 400 may include a base station 105-c and a UE 115-c, which may be corresponding examples of devices described with reference to FIGS. 1, 2A, 2B, and 2C. UE 115-c and base station 105-c may perform a multi-phase beam sweeping procedure. For instance, base station 105-b and UE 115-b may perform a first phase (e.g., P1) beam sweeping procedure to identify a coarse beam pair (e.g., a coarse transmit beam and a coarse receive beam) on which to communicate, as described with reference to FIG. 2A. Base station 105-c and UE 115-c may perform a second phase (e.g., P2) beam sweeping procedure to identify a refined transmit beam for base station 105-c, as described with reference to FIG. 2B, and may further perform a third phase (e.g., P3) beam sweeping procedure to identify a receive beam for UE 115-c. Prior to 405, base station 105-b and UE 115-b may complete a P1 beam sweeping procedure.

At 405, base station 105-c may transmit, and UE 115-c may receive, reference signal configuration information (e.g., SSB configuration information, CSI-RS configuration information, or the like). The configuration information may include configuration information for a first set of reference signals to be transmitted at 415 (e.g., SSBs or CSI-RSs to be transmitted at 415) and a second set of reference signals to be transmitted at 445 (e.g., CSI-RSs with repetition enabled in RRC signaling). Although FIG. 4 is illustrated and described with reference to CSI-RSs, the described reference signals may be any kind of reference signals, such as CSI-RSs, synchronization signals, or the like. For instance, in the case of CSI-RS configuration information, the CSI-RS configuration information may include CSI-RS configuration information for P2 and P3 beam sweeping procedures (e.g., at 415 and 445). The CSI-RS configuration information may include time resources, frequency resources, spatial resources, or a combination thereof for the CSI-RSs (e.g., a single set of CSI-RSs to be transmitted on multiple candidate transmit beams at 415 and on a single preferred transmit beam at 445). The CSI-RS configuration information may be included in a single configuration message (e.g., higher layer signaling, such as RRC signaling, control signaling such as DCI, or the like). In some examples, base station 105-c may transmit a first CSI-RS configuration information message for P2 beam sweeping and a second configuration information message for P3 beam sweeping. In some examples, base station 105-c may transmit the CSI-RS configuration information prior to transmitting the grant. The P2 CSI-RSs and the P3 CSI-RSs may be transmitted at different times (e.g., in different transmission time intervals (TTIs) (e.g., slots)), may be long to different resource sets, or any combination thereof. In some examples, when base station 105-c is configuring the P3 CSI-RS, or when UE 115-c prepares to receive the P3 CSI-RSs at 445, a temporary or initial TCI state may be set to temporarily be configured according to (e.g., pointed toward) the coarse transmit beam or coarse receive beam determined during the P1 beam sweeping (e.g., prior to 405). In some examples, the P2 reference signals may be SSBs or CSI-RSs, and the P3 reference signals may be CSI-RSs with repetition enabled via RRC signaling. Such RRC signaling (e.g., enabling repetition of the CSI-RSs) may be included in the CSI-RS configuration information, or may be provided in previous RRC messages.

At 410, base station 102-c may transmit, and UE 115-c may receive, a single grant that triggers both P2 CSI-RS transmissions at 415 and P3 CSI-RS transmissions at 445.

The grant may be a DCI message. In some examples, the DCI message may include resource allocation information for CSI-RSs at 415 and 445. In some examples, the DCI message may trigger transmission and reception of the CSI-RSs on previously configured CSI-RS resources (e.g., CSI-RS configuration information received at 405 via higher layer signaling). In some examples, the grant received by UE 115-*c* at 410 (or a different grant message) may further trigger the CSI report at 425. For instance, the grant may include resource allocation information (e.g., an indication of one or more resources, a timer or an offset from reception of the grant at 410, or the like), or may trigger transmission of a previously configured CSI report at 425.

At 415, base station 105-*c* may transmit a first set of reference signals (e.g., CSI-RSs or SSBs) to UE 115-*c* according to the reference signal configuration information. For example, base station 105-*c* may transmit a first CSI-RS on a first refined transmit beam (e.g., a refined beam that partially overlaps with a coarse transmit beam identified in a P1 beam sweeping procedure), a second CSI-RS on a second refined transmit beam, and a third CSI-RS on a third refined transmit beam, and so forth. UE 115-*c* may receive the CSI-RSs using the coarse receive beam identified during the P1 beam sweeping.

AT 420, UE 115-*c* may perform one or more measurements on the CSI-RSs received at 415, and may generate a CSI report for transmission at 425. For instance, UE 115-*c* may measure one or more channel quality metrics (e.g., RSRP, RSRQ, or the like) for each received CSI-RS, and may determine one or more preferred transmit beams (e.g., one or more CSI-RSs associated with a particular refined transmit beam) based on the measurements.

At 425, UE 115-*c* may transmit the CSI report to base station 105-*c*. UE 115-*c* may include, in the CSI report, one or more measurement values associated with the respective transmit beams on which the CSI-RSs were received, an indication of one or more preferred transmit beams based on the measurement values, or a combination thereof.

At 430, UE 115-*c* may autonomously update a TCI state based on the CSI report. For example, UE 115-*c* may update its TCI state to receive (e.g., point toward) the preferred transmit beam indicated in the CSI report. UE 115-*c* may prepare to receive the P3 CSI-RSs at 445 using the TCI state associated with the preferred transmit beam. For example, UE 115-*c* may reconfigure or adjust one or more antennas, one or more antenna ports, one or more TCI states, or the like, to receive CSI-RSs transmitted by base station 105-*c* on the preferred transmit beam. In some examples, UE 115-*c* may autonomously update the TCI state based on one or more rules (e.g., according to rules defined in a standards document, according to a preconfigured rule, or the like). UE 115-*c* may change the source reference signal of a TCI state (e.g., from a previously configured reference signal (RS) or initial TCI state, such as a TCI state indicated in the CSI-RS configuration information or used to receive CSI-RSs at 415) to the CSI-RS associated with the best CSI-RS (e.g., the CSI-RS having the highest RSRP associated with the preferred transmit beam). In some examples, UE 115-*c* may autonomously configure a source reference signal of a TCI state (e.g., the TCI state of the CSI-RS) to the reported CSI-RS in the P2 beam sweep.

In some examples, autonomously updating the TCI state of UE 115-*c* may include updating a source reference signal of a TCI state (e.g., a previously used, default, or previously configured TCI state) to a chosen or preferred reference signal of the first set of reference signals (e.g., the CSI-RSs or SSBs received at 415) based on the received CSI report.

In some examples, UE 115-*c* may autonomously change the TCI state associated with the second set of reference signals (CSI-RSs configured at 405 to be received at 445) to a TCI state associated with a chosen reference signal of the first set of reference signals received at 415. The chosen reference signal associated with the first set of reference signals may be based on the CSI report.

AT 435, base station 105-*c* may autonomously update its TCI state according to the CSI report received at 425. For instance, base station 105-*c* may identify the preferred transmit beam (e.g., the transmit beam associated with a CSI-RS having a highest channel quality metric such as RSRP) as indicated in the CSI report. According to a rule (e.g., according to rules defined in a standards document, according to a preconfigured rule, or the like), base station 105-*c* may automatically update its TCI state (e.g., by adjusting one or more antennas, one or more antenna ports, one or more active TCI states, or the like) to transmit CSI-RSs at 445 on the preferred transmit beam.

In some examples, autonomously updating the TCI state of base station 105-*c* may include updating a source reference signal of a TCI state (e.g., a previously used, default, or previously configured TCI state) to a chosen or preferred reference signal of the first set of reference signals (e.g., the CSI-RSs or SSBs received at 415) based on the received CSI report.

In some examples, base station 105-*c* may autonomously change the TCI state associated with the second set of reference signals (CSI-RSs configured at 405 to be received at 445) to a TCI state associated with a chosen reference signal of the first set of reference signals received at 415. The chosen reference signal associated with the first set of reference signals may be based on the CSI report.

After updating the TCI state at 435, base station 105-*c* may prepare to transmit the CSI-RSs on the preferred transmit beam at 445. However, in some examples, the preferred transmit beam indicated in the CSI report may not be a viable option for transmitting the CSI-RSs at 445. For instance, base station 105-*c* may fail to receive the CSI report, or the preferred beam may no longer be a preferred beam by 445 (e.g., due to changes in traffic, UE mobility, increased system congestion, increased interference, or the like). In such examples, base station 105-*c* may select a different transmit beam (e.g., a next-best transmit beam indicated in the CSI report, a previously utilized transmit beam, or the like) for transmitting the CSI-RSs, and may transmit a TCI state reconfiguration message at 440. The TCI state reconfiguration message may include an indication of the different transmit beam, an indication of a different TCI state associated with the different transmit beam, or the like. Thus, if base station 105-*c* is able to use the preferred transmit beam indicated in the CSI report, then base station 105-*c* may refrain from transmitting the TCI state reconfiguration message at 440, and base station 105-*c* may transmit the CSI-RSs according to the TCI state updated at 435. However, if base station 105-*c* is unable to use the indicated preferred transmit beam, then base station 105-*c* may indicate a different TCI state in the TCI state reconfiguration message.

UE 115-*c* may wait for a threshold amount of time after transmitting the CSI report before monitoring for and receiving the CSI-RSs. For instance, UE 115-*c* may initiate a timer upon transmitting the CSI report at 425, or may identify (e.g., according to a rule) a subsequent TTI or set of TTIs that is a threshold number of TTIs (e.g., symbols, slots, etc.) after the TTI in which UE 115-*c* transmits the CSI report. During the threshold amount of time, UE 115-*c* may monitor for a TCI state reconfiguration message. If UE 115-*c* receives a TCI state reconfiguration message, then UE 115-*c* may reconfigure the updated TCI state from 430 to a TCI state indicated in the TCI state reconfiguration message, and may monitor for and receive CSI-RSs at 445 according to the reconfigured TCI state. However, if UE 115-*c* does not receive the TCI state reconfiguration message during the threshold time period, then after the threshold time period (e.g., upon expiration of the timer or during the identified TTI), UE 115-*c* may monitor for and receive the CSI-RSs according to the CSI-RS configuration information received at 405 using the TCI state updated at 430.

At 445, base station 105-*c* may transmit, and UE 115-*c* may receive, the second set of reference signals (e.g., CSI-RSs) according to the CSI-RS configuration information indicated at 405. If no change was indicated at 440, then base station 105-*c* may transmit the CSI-RSs at different times on the preferred transmit beam indicated at 425. UE 115-*c* may receive the CSI-RSs at different times on different candidate refined receive beams, and may identify a preferred receive beam based on measurements performed on the CSI-RSs. Base station 105-*c* may transmit the CSI-RSs after the threshold time after receiving the CSI report has expired.

By performing P2 beam sweeping and P3 beam sweeping as described herein, UE 115-*c* and base station 105-*c* may decrease signaling overhead, computational overhead, and time delays. For example, transmitting the CSI-RS configuration information for P2 beam sweeping and P3 beam sweeping at 405, a single grant for P2 CSI-RSs and P3 CSI-RSs at 410, or a single message including both the grant and the CSI-RS configuration information, base station 105-*c* and UE 115-*c* may avoid the time delays that result from separately configuring and triggering P2 and P3 beam sweeping procedures. Additionally, by autonomously updating the TCI states at 430 and 435, base station 105-*c* and UE 115-*c* avoid unnecessary signaling indicating new TCI states based on the CSI report, decrease signaling and computational overhead, and avoid time delays. Both UE 115-*c* and base station 105-*c* can indicate an update to a TCI state as soon as the CSI report is transmitted at 425, avoiding additional delays resulting from delayed or staggered TCI state updates (e.g., as described with reference to FIG. 3). This may result in decreased system latency, increased system efficiency, decreased battery expenditure and increased battery life for UE 115-*c*, and improved user experience.

Figure 5:
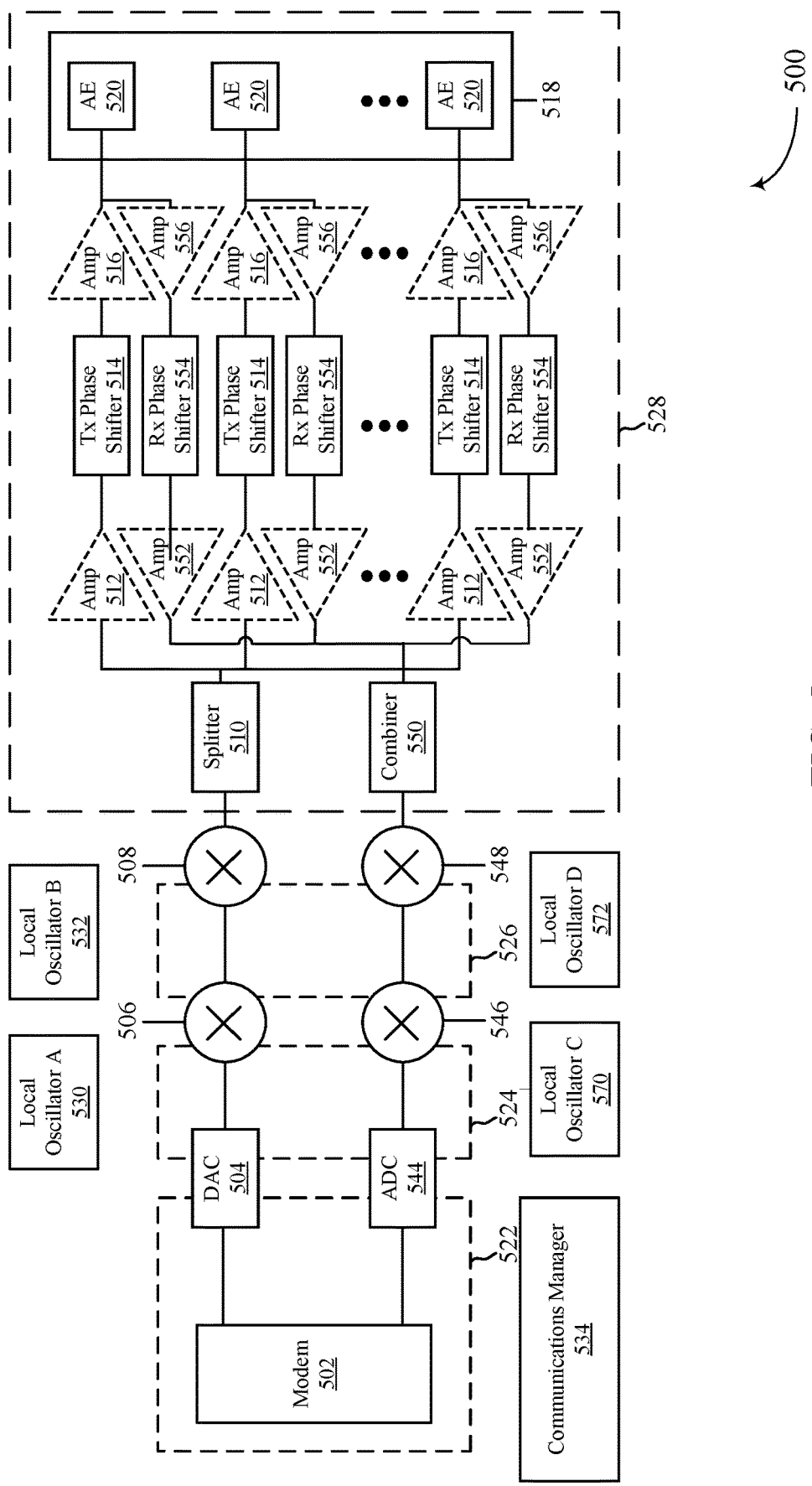
FIG. 5 illustrates an example of an architecture that supports combined beam sweeping procedure in accordance with aspects of the present disclosure.

FIG. 5 illustrates an example of an architecture 500 that supports combined beam sweeping procedure in accordance with aspects of the present disclosure. In some examples, architecture 500 may implement aspects of wireless communication systems 100, 200, 201, and/or 202 and/or process flow 300 or process flow 400. In some aspects, architecture 500 may be an example of the transmitting device (e.g., a first wireless device) and/or a receiving device (e.g., a second wireless device) as described herein.

Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 500 includes a modem (modulator/demodulator) 402, a digital to analog converter (DAC) 504, a first mixer 506, a second mixer 508, and a splitter 510. The architecture 500 also includes a plurality of first amplifiers 512, a plurality of phase shifters 514, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog RF signals travel or are processed. The architecture also includes a local oscillator A 530, a local oscillator B 532, and a communications manager 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 516 are present. In another, neither the first amplifier 512 nor the second amplifier 516 is present. In other implementations, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the communications manager 534 may have at least one control line connected to each of the phase shifters 554 and which may be used to configure the phase shifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 554 (via the amplifiers 552 when present) are combined in combiner 550. The combiner 550 in architecture 500 combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 is input to modem 502 for baseband processing, e.g., decoding, de-interleaving, etc.

The architecture 500 is given by way of example to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions.

Furthermore, mixers, splitters, amplifiers, phase shifters and other components may be located in different signal type areas (e.g., different ones of the boxes 522, 524, 526, 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator phase shifting. In one implementation of this configuration, there may be a plurality of IF to RF mixers (e.g., for each antenna element chain) within the second mixer 508 and the local oscillator B 532 would supply different local oscillator signals (with different phase offsets) to each IF to RF mixer.

The modem 502 and/or the communications manager 534 may control one or more of the other components 504-472 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the plurality of signals relative to each other.

The communications manager 534 may, when architecture 500 is configured as a receiving device, transmit a first beam measurement report to a first wireless device, the first beam measurement report indicating a first set of beam measurements for a wireless channel between the first wireless device and the second wireless device. The communications manager 534 may receive from the first wireless device a cluster validity metric for at least one beam in the first beam measurement report. The communications manager 534 may transmit to the first wireless device a second beam measurement report based at least in part on the cluster validity metric, the second beam measurement report indicating a second set of beam measurements for the wireless channel, as discussed herein. The communications manager 534 may, when architecture 500 is configured as a transmitting device, receive a first beam measurement report from a second wireless device, the first beam measurement report indicating a first set of beam measurements for a wireless channel between the first wireless device and the second wireless device. The communications manager 534 may transmit to the second wireless device a cluster validity metric for at least one beam in the first beam measurement report. The communications manager 534 may receive from the second wireless device, in response to transmitting the cluster validity metric, a second beam measurement report indicating a second set of beam measurements for the wireless channel. The communications manager 534 may select a beam for transmitting to the second wireless device based at least in part on the first and second beam measurement reports, as discussed herein. The communications manager 534 may be located partially or fully within one or more other components of the architecture 500. For example, the communications manager 534 may be located within the modem 502 in at least one implementation.

Figure 6:
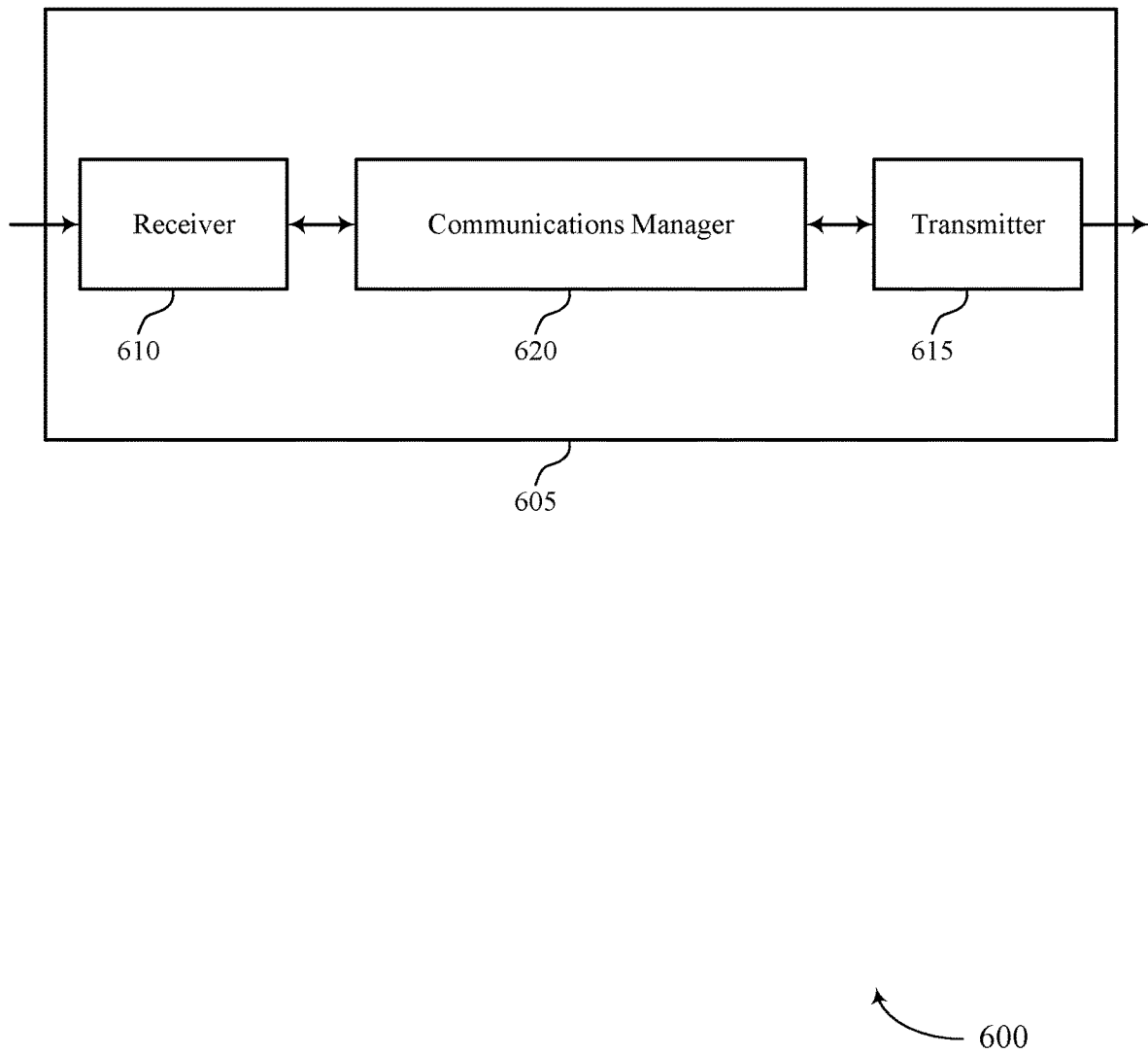
FIGS. 6 and 7 show block diagrams of devices that support combined beam sweeping procedure in accordance with aspects of the present disclosure.

FIG. 6 shows a block diagram 600 of a device 605 that supports combined beam sweeping procedure in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to combined beam sweeping procedure). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to combined beam sweeping procedure). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of combined beam sweeping procedure as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, first reference signal configuration information associated with a first beam sweeping procedure, and second reference signal configuration information associated with a second beam sweeping procedure. The communications manager 620 may be configured as or otherwise support a means for receiving, from the base station during the first beam sweeping procedure, a first set of reference signals according to the first reference signal configuration information, each reference signal of the first set of reference signals associated with a respective transmit beam of a set of transmit beams. The communications manager 620 may be configured as or otherwise support a means for transmitting, to the base station responsive to receiving the first set of reference signals, a channel state information report including an indication of a preferred transmit beam of the set of transmit beams. The communications manager 620 may be configured as or otherwise support a means for autonomously updating a transmission configuration indicator state based on the channel state information report.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for increasing signaling and processing efficiency, by autonomously updating a TCI state for the device (e.g., without relying on explicit signaling from another device). The supported techniques may result in increased system efficiency, decreased time delays, decreased power expenditures, improved battery life, saved computational resources, and improved user experience.

Figure 7:
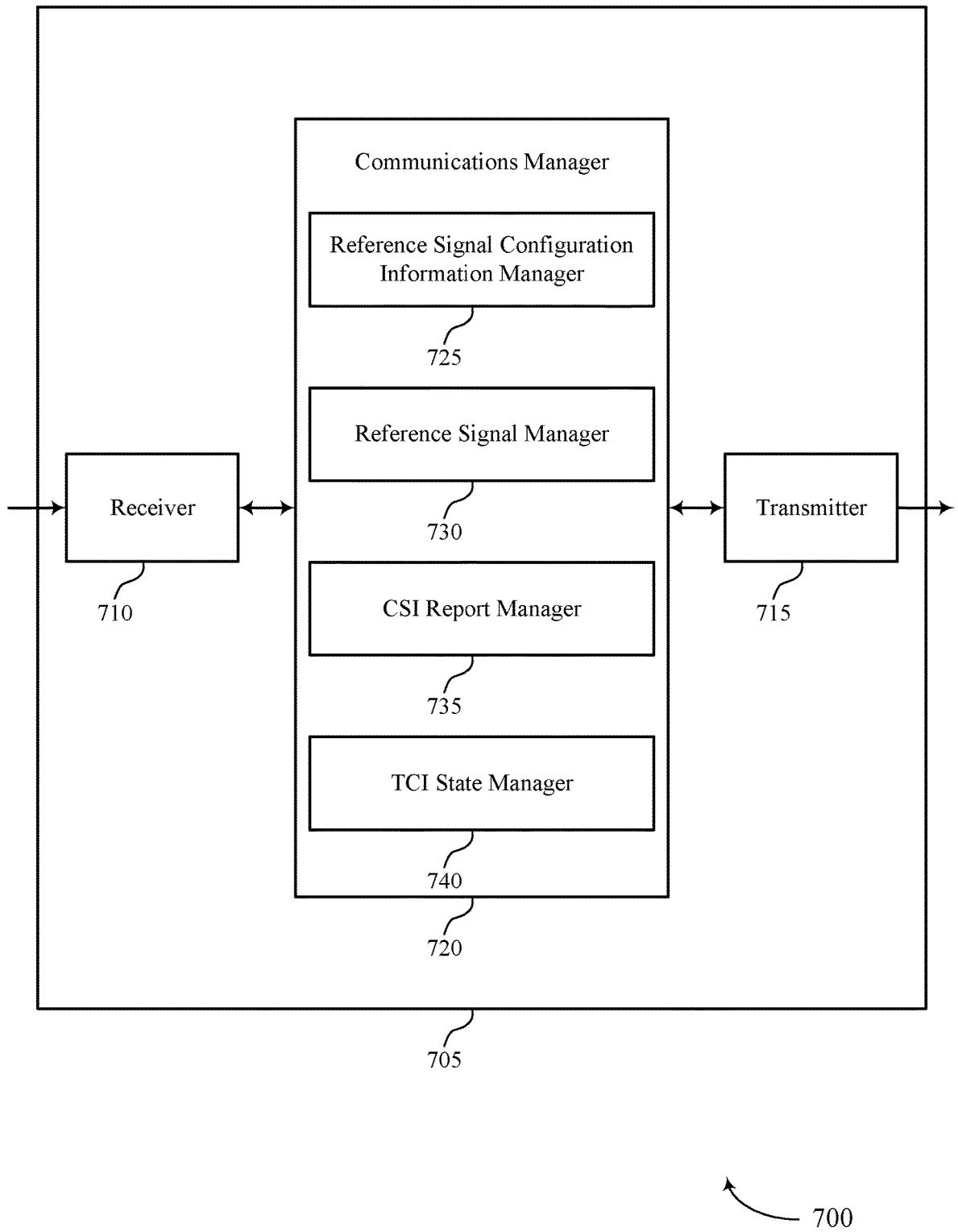

FIG. 7 shows a block diagram 700 of a device 705 that supports combined beam sweeping procedure in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to combined beam sweeping procedure). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to combined beam sweeping procedure). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of combined beam sweeping procedure as described herein. For example, the communications manager 720 may include a reference signal configuration information manager 725, a reference signal manager 730, a CSI report manager 735, a TCI state manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The reference signal configuration information manager 725 may be configured as or otherwise support a means for receiving, from a base station, first reference signal configuration information associated with a first beam sweeping procedure, and second reference signal configuration information associated with a second beam sweeping procedure. The reference signal manager 730 may be configured as or otherwise support a means for receiving, from the base station during the first beam sweeping procedure, a first set of reference signals according to the first reference signal configuration information, each reference signal of the first set of reference signals associated with a respective transmit beam of a set of transmit beams. The CSI report manager 735 may be configured as or otherwise support a means for transmitting, to the base station responsive to receiving the first set of reference signals, a channel state information report including an indication of a preferred transmit beam of the set of transmit beams. The TCI state manager 740 may be configured as or otherwise support a means for autonomously updating a transmission configuration indicator state based on the channel state information report.

Figure 8:
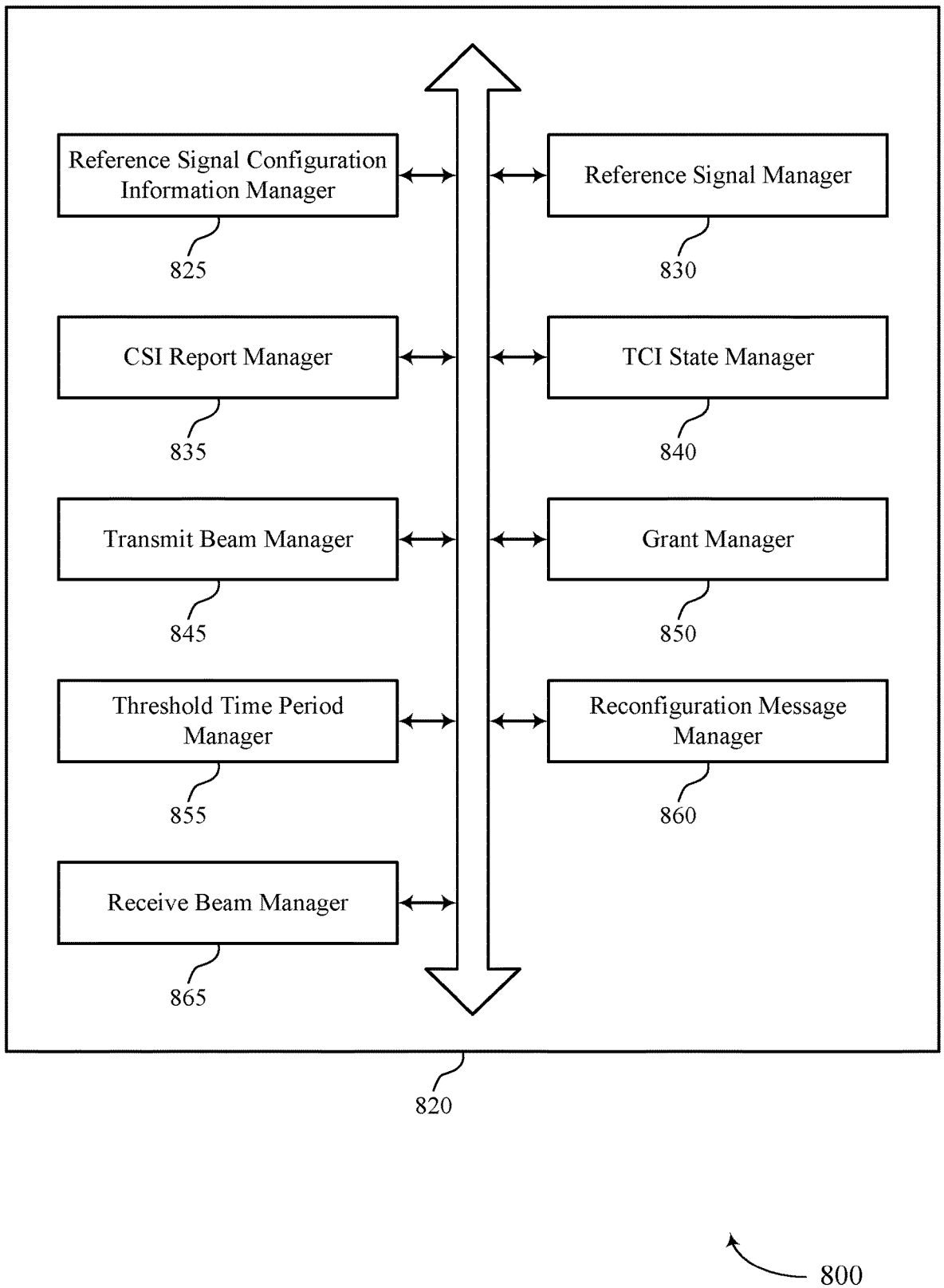
FIG. 8 shows a block diagram of a communications manager that supports combined beam sweeping procedure in accordance with aspects of the present disclosure.

FIG. 8 shows a block diagram 800 of a communications manager 820 that supports combined beam sweeping procedure in accordance with aspects of the present disclosure. The communications manager 820 may be an example of aspects of a communications manager 620, a communications manager 720, or both, as described herein. The communications manager 820, or various components thereof, may be an example of means for performing various aspects of combined beam sweeping procedure as described herein. For example, the communications manager 820 may include a reference signal configuration information manager 825, a reference signal manager 830, a CSI report manager 835, a TCI state manager 840, a transmit beam manager 845, a grant manager 850, a threshold time period manager 855, a reconfiguration message manager 860, a receive beam manager 865, or any combination thereof. Each of these components may communicate, directly or indirectly, with one another (e.g., via one or more buses).

The communications manager 820 may support wireless communications at a UE in accordance with examples as disclosed herein. The reference signal configuration information manager 825 may be configured as or otherwise support a means for receiving, from a base station, first reference signal configuration information associated with a first beam sweeping procedure, and second reference signal configuration information associated with a second beam sweeping procedure. The reference signal manager 830 may be configured as or otherwise support a means for receiving, from the base station during the first beam sweeping procedure, a first set of reference signals according to the first reference signal configuration information, each reference signal of the first set of reference signals associated with a respective transmit beam of a set of transmit beams. The CSI report manager 835 may be configured as or otherwise support a means for transmitting, to the base station responsive to receiving the first set of reference signals, a channel state information report including an indication of a preferred transmit beam of the set of transmit beams. The TCI state manager 840 may be configured as or otherwise support a means for autonomously updating a transmission configuration indicator state based on the channel state information report.

In some examples, to support autonomously updating the transmission configuration indicator state, the transmit beam manager 845 may be configured as or otherwise support a means for selecting the preferred transmit beam of the set of transmit beams. In some examples, to support autonomously updating the transmission configuration indicator state, the TCI state manager 840 may be configured as or otherwise support a means for configuring one or more antenna ports for receiving downlink signaling on the preferred transmit beam.

In some examples, the threshold time period manager 855 may be configured as or otherwise support a means for identifying a threshold time period. In some examples, the threshold time period manager 855 may be configured as or otherwise support a means for determining that the threshold time period is satisfied, where selecting the preferred transmit beam of the set of transmit beams is based on determining that the threshold time period is satisfied.

In some examples, the reference signal manager 830 may be configured as or otherwise support a means for receiving, from the base station during the second beam sweeping procedure, a second set of reference signals on the preferred transmit beam based on the updated transmission configuration indicator state and according to the second reference signal configuration information.

In some examples, to support receiving the second set of reference signals, the receive beam manager 865 may be configured as or otherwise support a means for receiving the second set of reference signals on a set of receive beams, each reference signal of the second set of reference signals associated with a respective receive beam of the set of receive beams.

In some examples, the receive beam manager 865 may be configured as or otherwise support a means for selecting, based on receiving the second set of reference signals on the set of receive beams, a preferred receive beam of the set of receive beams.

In some examples, the grant manager 850 may be configured as or otherwise support a means for receiving a grant triggering the first beam sweeping procedure and the second beam sweeping procedure.

In some examples, the grant further triggers the channel state information report.

In some examples, the threshold time period manager 855 may be configured as or otherwise support a means for identifying a threshold time period. In some examples, the reconfiguration message manager 860 may be configured as or otherwise support a means for monitoring, during the threshold time period, for a reconfiguration message from the base station. In some examples, the reconfiguration message manager 860 may be configured as or otherwise support a means for receiving, from the base station based on the monitoring, the reconfiguration message indicating a second transmit beam from the set of transmit beams that is different than the preferred transmit beam. In some examples, the TCI state manager 840 may be configured as or otherwise support a means for reconfiguring the transmission configuration indicator state based on the second transmit beam.

In some examples, the reference signal manager 830 may be configured as or otherwise support a means for receiving, from the base station during the second beam sweeping procedure, a second set of reference signals on the second transmit beam based on the reconfigured transmission configuration indicator state and according to the second reference signal configuration information.

In some examples, to support receiving the first reference signal configuration information and the second reference signal configuration information, the reference signal configuration information manager 825 may be configured as or otherwise support a means for receiving a single control message including both the first reference signal configuration information and the second reference signal configuration information.

In some examples, to support receiving the first reference signal configuration information and the second reference signal configuration information, the reference signal configuration information manager 825 may be configured as or otherwise support a means for receiving a first control message including the first reference signal configuration information. In some examples, to support receiving the first reference signal configuration information and the second reference signal configuration information, the reference signal configuration information manager 825 may be configured as or otherwise support a means for receiving a second control message including the second reference signal configuration information.

Figure 9:
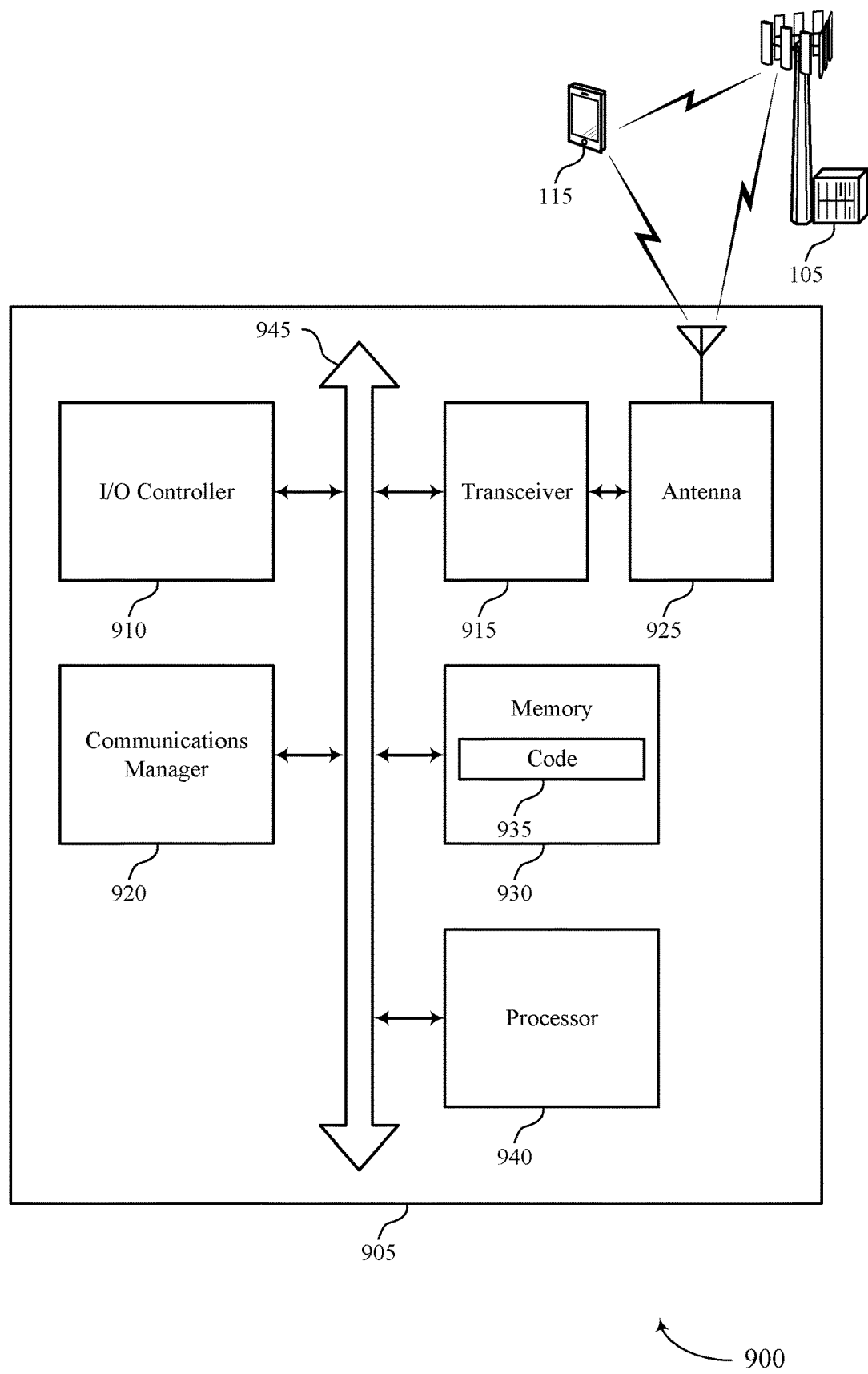
FIG. 9 shows a diagram of a system including a device that supports combined beam sweeping procedure in accordance with aspects of the present disclosure.

FIG. 9 shows a diagram of a system 900 including a device 905 that supports combined beam sweeping procedure in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting combined beam sweeping procedure). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, first reference signal configuration information associated with a first beam sweeping procedure, and second reference signal configuration information associated with a second beam sweeping procedure. The communications manager 920 may be configured as or otherwise support a means for receiving, from the base station during the first beam sweeping procedure, a first set of reference signals according to the first reference signal configuration information, each reference signal of the first set of reference signals associated with a respective transmit beam of a set of transmit beams. The communications manager 920 may be configured as or otherwise support a means for transmitting, to the base station responsive to receiving the first set of reference signals, a channel state information report including an indication of a preferred transmit beam of the set of transmit beams. The communications manager 920 may be configured as or otherwise support a means for autonomously updating a transmission configuration indicator state based on the channel state information report.

By including or configuring the communications manager 920 in accordance with examples as described herein, the device 905 may support techniques for increasing signaling and processing efficiency, by autonomously updating a TCI state for the device (e.g., without relying on explicit signaling from another device). The supported techniques may result in increased system efficiency, decreased time delays, decreased power expenditures, improved battery life, saved computational resources, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of combined beam sweeping procedure as described herein, or the processor 940 and the memory 930 may be otherwise configured to perform or support such operations.

Figure 10:
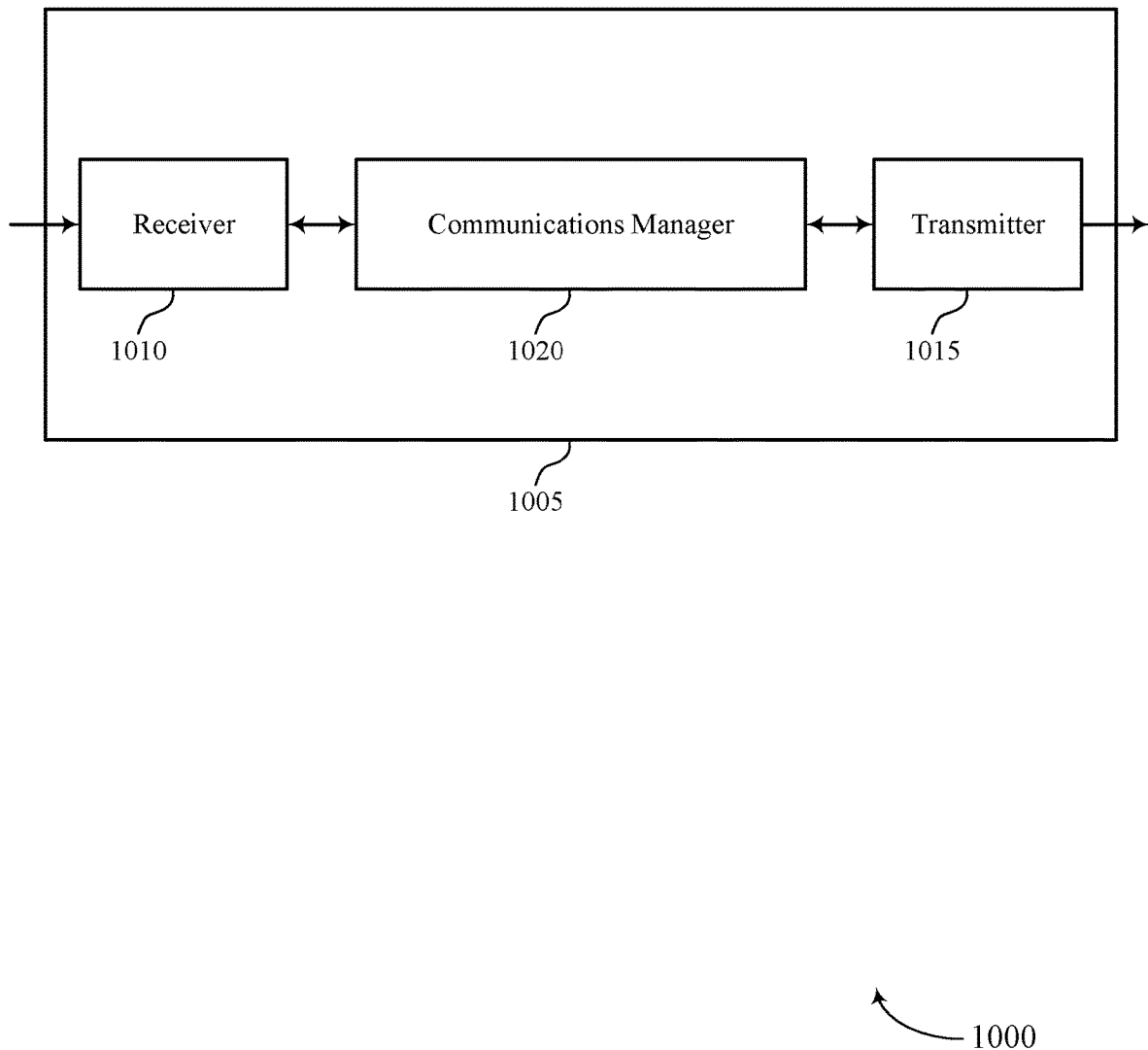
FIGS. 10 and 11 show block diagrams of devices that support combined beam sweeping procedure in accordance with aspects of the present disclosure.

FIG. 10 shows a block diagram 1000 of a device 1005 that supports combined beam sweeping procedure in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to combined beam sweeping procedure). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to combined beam sweeping procedure). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of combined beam sweeping procedure as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE first reference signal configuration information associated with a first beam sweeping procedure, and second reference signal configuration information associated with a second beam sweeping procedure. The communications manager 1020 may be configured as or otherwise support a means for transmitting, to the UE during the first beam sweeping procedure, a first set of reference signals according to the first reference signal configuration information, each reference signal of the first set of reference signals associated with a respective transmit beam of a set of transmit beams. The communications manager 1020 may be configured as or otherwise support a means for receiving, from the UE based on transmitting the first set of reference signals, a channel state information report including an indication of a preferred transmit beam of the set of transmit beams. The communications manager 1020 may be configured as or otherwise support a means for autonomously updating a transmission configuration indicator state based on the channel state information report.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for increasing signaling and processing efficiency, and decreasing time delays, by autonomously updating a TCI state for the device (e.g., without having to explicitly signal other devices accordingly). The supported techniques may result in increased system efficiency, decreased time delays, decreased power expenditures, improved battery life, saved computational resources, and improved user experience.

Figure 11:
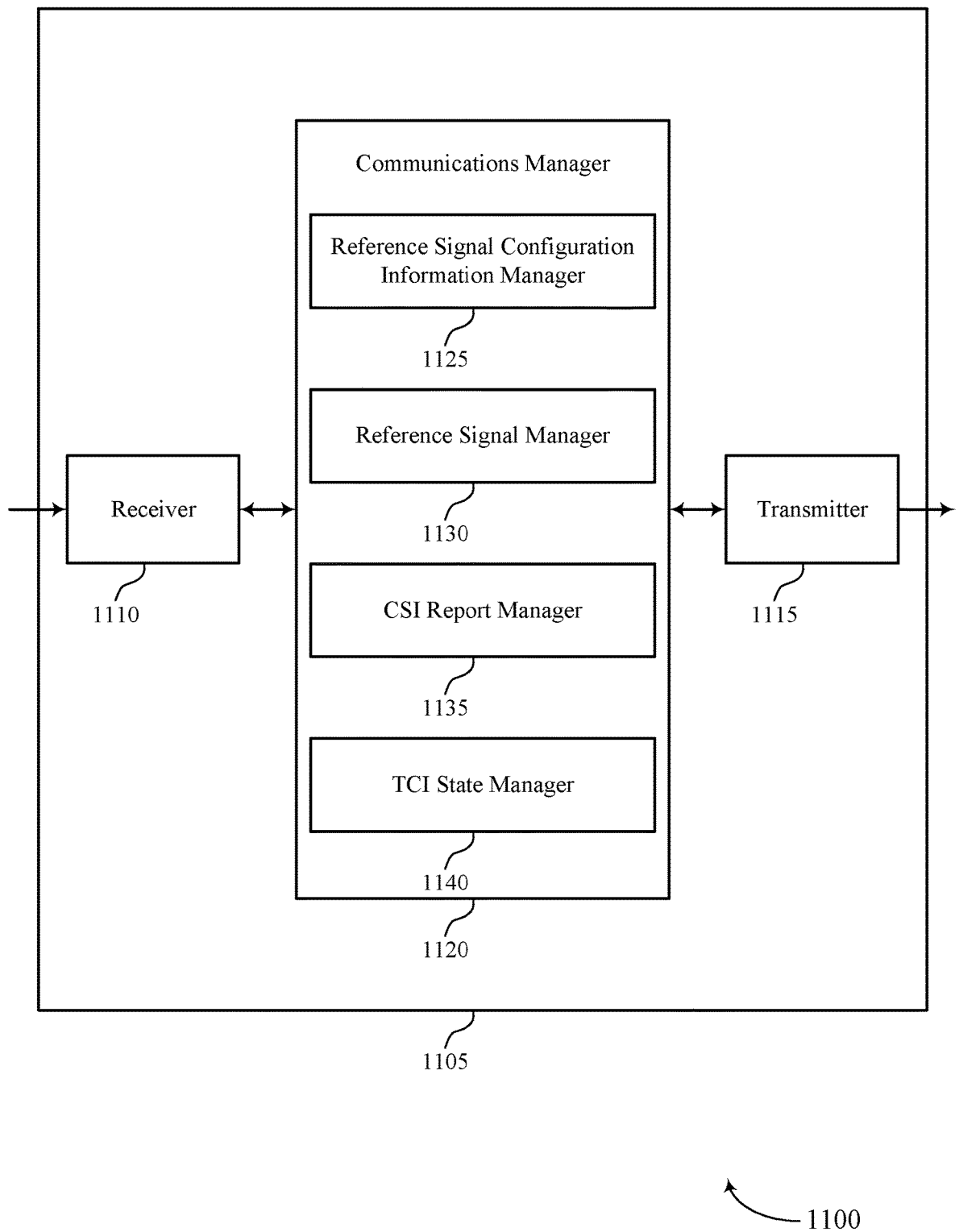

FIG. 11 shows a block diagram 1100 of a device 1105 that supports combined beam sweeping procedure in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to combined beam sweeping procedure). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to combined beam sweeping procedure). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of combined beam sweeping procedure as described herein.

For example, the communications manager 1120 may include a reference signal configuration information manager 1125, a reference signal manager 1130, a CSI report manager 1135, a TCI state manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The reference signal configuration information manager 1125 may be configured as or otherwise support a means for transmitting, to a UE first reference signal configuration information associated with a first beam sweeping procedure, and second reference signal configuration information associated with a second beam sweeping procedure. The reference signal manager 1130 may be configured as or otherwise support a means for transmitting, to the UE during the first beam sweeping procedure, a first set of reference signals according to the first reference signal configuration information, each reference signal of the first set of reference signals associated with a respective transmit beam of a set of transmit beams. The CSI report manager 1135 may be configured as or otherwise support a means for receiving, from the UE based on transmitting the first set of reference signals, a channel state information report including an indication of a preferred transmit beam of the set of transmit beams. The TCI state manager 1140 may be configured as or otherwise support a means for autonomously updating a transmission configuration indicator state based on the channel state information report.

Figure 12:
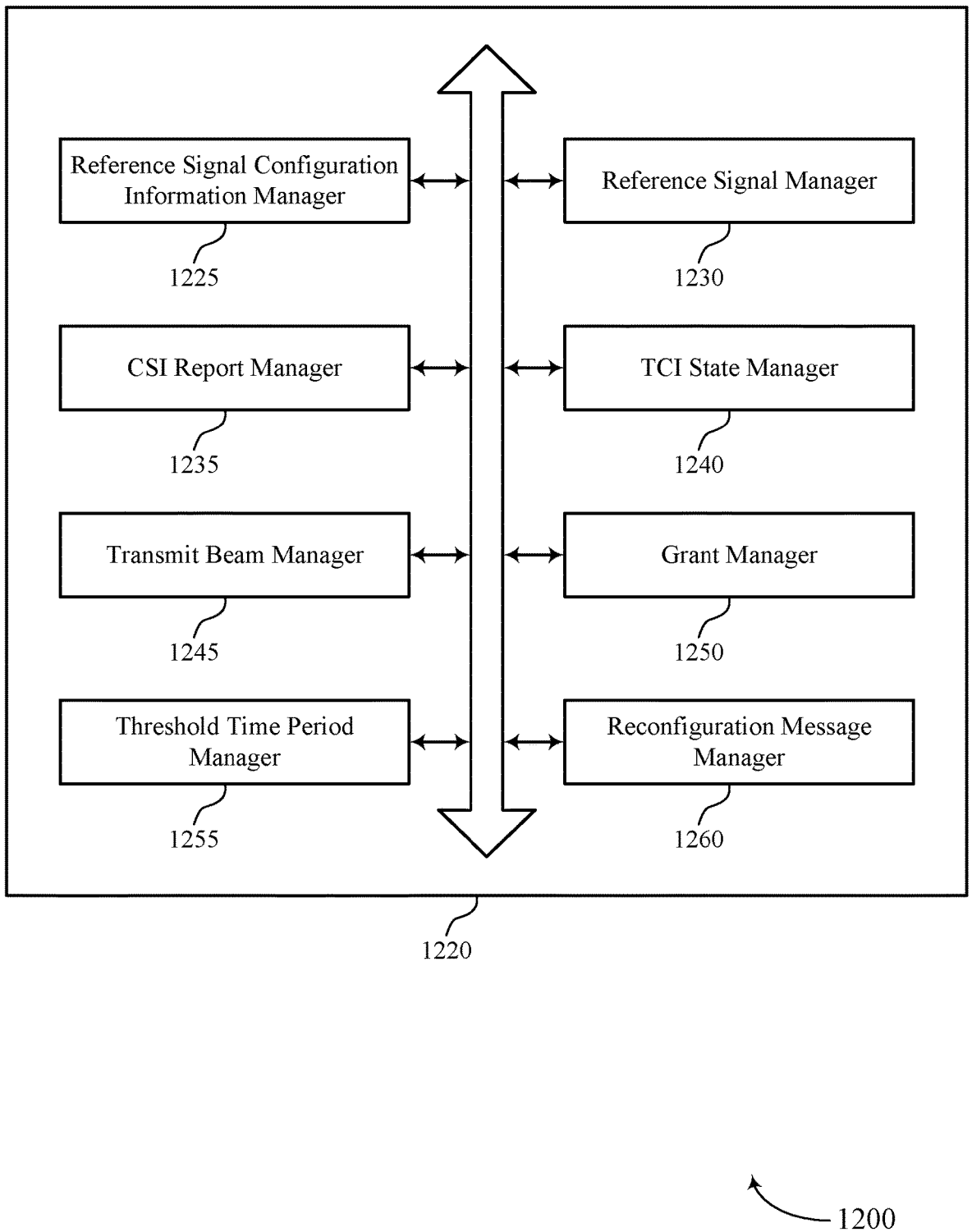
FIG. 12 shows a block diagram of a communications manager that supports combined beam sweeping procedure in accordance with aspects of the present disclosure.

FIG. 12 shows a block diagram 1200 of a communications manager 1220 that supports combined beam sweeping procedure in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of combined beam sweeping procedure as described herein. For example, the communications manager 1220 may include a reference signal configuration information manager 1225, a reference signal manager 1230, a CSI report manager 1235, a TCI state manager 1240, a transmit beam manager 1245, a grant manager 1250, a threshold time period manager 1255, a reconfiguration message manager 1260, or any combination thereof. Each of these components may communicate, directly or indirectly, with one another (e.g., via one or more buses).

The communications manager 1220 may support wireless communications at a base station in accordance with examples as disclosed herein. The reference signal configuration information manager 1225 may be configured as or otherwise support a means for transmitting, to a UE first reference signal configuration information associated with a first beam sweeping procedure, and second reference signal configuration information associated with a second beam sweeping procedure. The reference signal manager 1230 may be configured as or otherwise support a means for transmitting, to the UE during the first beam sweeping procedure, a first set of reference signals according to the first reference signal configuration information, each reference signal of the first set of reference signals associated with a respective transmit beam of a set of transmit beams. The CSI report manager 1235 may be configured as or otherwise support a means for receiving, from the UE based on transmitting the first set of reference signals, a channel state information report including an indication of a preferred transmit beam of the set of transmit beams. The TCI state manager 1240 may be configured as or otherwise support a means for autonomously updating a transmission configuration indicator state based on the channel state information report.

In some examples, to support autonomously updating the transmission configuration indicator state, the transmit beam manager 1245 may be configured as or otherwise support a means for selecting the preferred transmit beam of the set of transmit beams. In some examples, to support autonomously updating the transmission configuration indicator state, the TCI state manager 1240 may be configured as or otherwise support a means for configuring one or more antenna ports for transmitting downlink signaling on the preferred transmit beam.

In some examples, the reference signal manager 1230 may be configured as or otherwise support a means for transmitting, to the UE during the second beam sweeping procedure, a second set of reference signals on the preferred transmit beam based on the updated transmission configuration indicator state and according to the second reference signal configuration information.

In some examples, to support transmitting the second set of reference signals, the reference signal manager 1230 may be configured as or otherwise support a means for transmitting each reference signal of the second set of reference signals at a different time, each reference signal of the second set of reference signals associated with a respective receive beam of a set of receive beams.

In some examples, the grant manager 1250 may be configured as or otherwise support a means for transmitting a grant triggering the first beam sweeping procedure and the second beam sweeping procedure. In some examples, the grant further triggers the channel state information report.

In some examples, the threshold time period manager 1255 may be configured as or otherwise support a means for identifying a threshold time period. In some examples, the reconfiguration message manager 1260 may be configured as or otherwise support a means for transmitting, to the UE during the threshold time period, a reconfiguration message indicating a second transmit beam from the set of transmit beams that is different than the preferred transmit beam. In some examples, the TCI state manager 1240 may be configured as or otherwise support a means for reconfiguring the transmission configuration indicator state based on the second transmit beam.

In some examples, the reference signal manager 1230 may be configured as or otherwise support a means for transmitting, to the UE during the second beam sweeping procedure, a second set of reference signals on the second transmit beam based on the reconfigured transmission configuration indicator state and according to the second reference signal configuration information.

In some examples, to support transmitting the first reference signal configuration information and the second reference signal configuration information, the reference signal configuration information manager 1225 may be configured as or otherwise support a means for transmitting a single control message including both the first reference signal configuration information and the second reference signal configuration information.

In some examples, to support transmitting the first reference signal configuration information and the second reference signal configuration information, the reference signal configuration information manager 1225 may be configured as or otherwise support a means for transmitting a first control message including the first reference signal configuration information. In some examples, to support transmitting the first reference signal configuration information and the second reference signal configuration information, the reference signal configuration information manager 1225 may be configured as or otherwise support a means for transmitting a second control message including the second reference signal configuration information.

Figure 13:
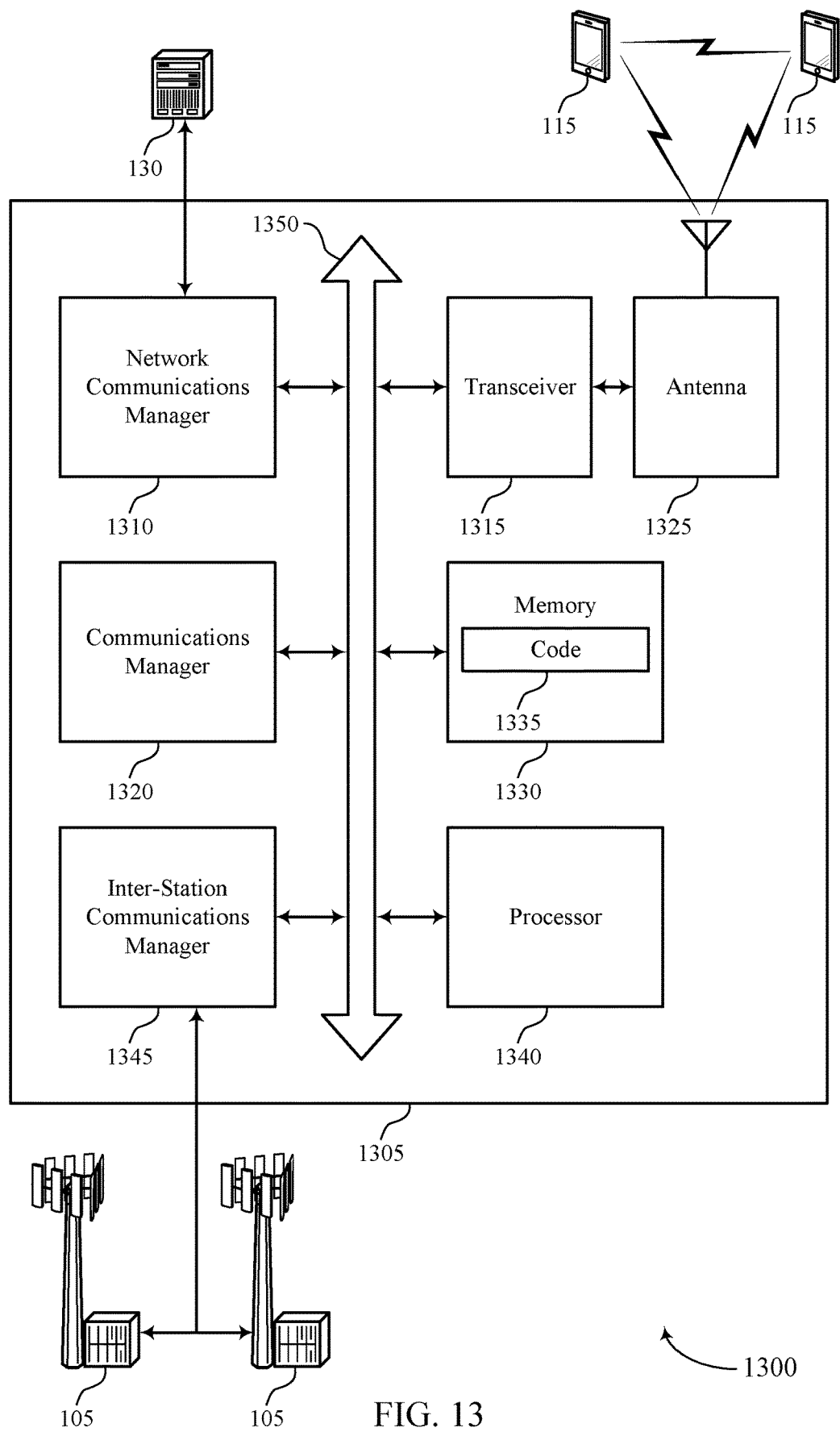
FIG. 13 shows a diagram of a system including a device that supports combined beam sweeping procedure in accordance with aspects of the present disclosure.

FIG. 13 shows a diagram of a system 1300 including a device 1305 that supports combined beam sweeping procedure in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory.

In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting combined beam sweeping procedure). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE first reference signal configuration information associated with a first beam sweeping procedure, and second reference signal configuration information associated with a second beam sweeping procedure. The communications manager 1320 may be configured as or otherwise support a means for transmitting, to the UE during the first beam sweeping procedure, a first set of reference signals according to the first reference signal configuration information, each reference signal of the first set of reference signals associated with a respective transmit beam of a set of transmit beams. The communications manager 1320 may be configured as or otherwise support a means for receiving, from the UE based on transmitting the first set of reference signals, a channel state information report including an indication of a preferred transmit beam of the set of transmit beams. The communications manager 1320 may be configured as or otherwise support a means for autonomously updating a transmission configuration indicator state based on the channel state information report.

By including or configuring the communications manager 1320 in accordance with examples as described herein, the device 1305 may support techniques for increasing signaling and processing efficiency, and decreasing time delays, by autonomously updating a TCI state for the device (e.g., without having to explicitly signal other devices accordingly). The supported techniques may result in increased system efficiency, decreased time delays, decreased power expenditures, improved battery life, saved computational resources, and improved user experience.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of combined beam sweeping procedure as described herein, or the processor 1340 and the memory 1330 may be otherwise configured to perform or support such operations.

Figure 14:
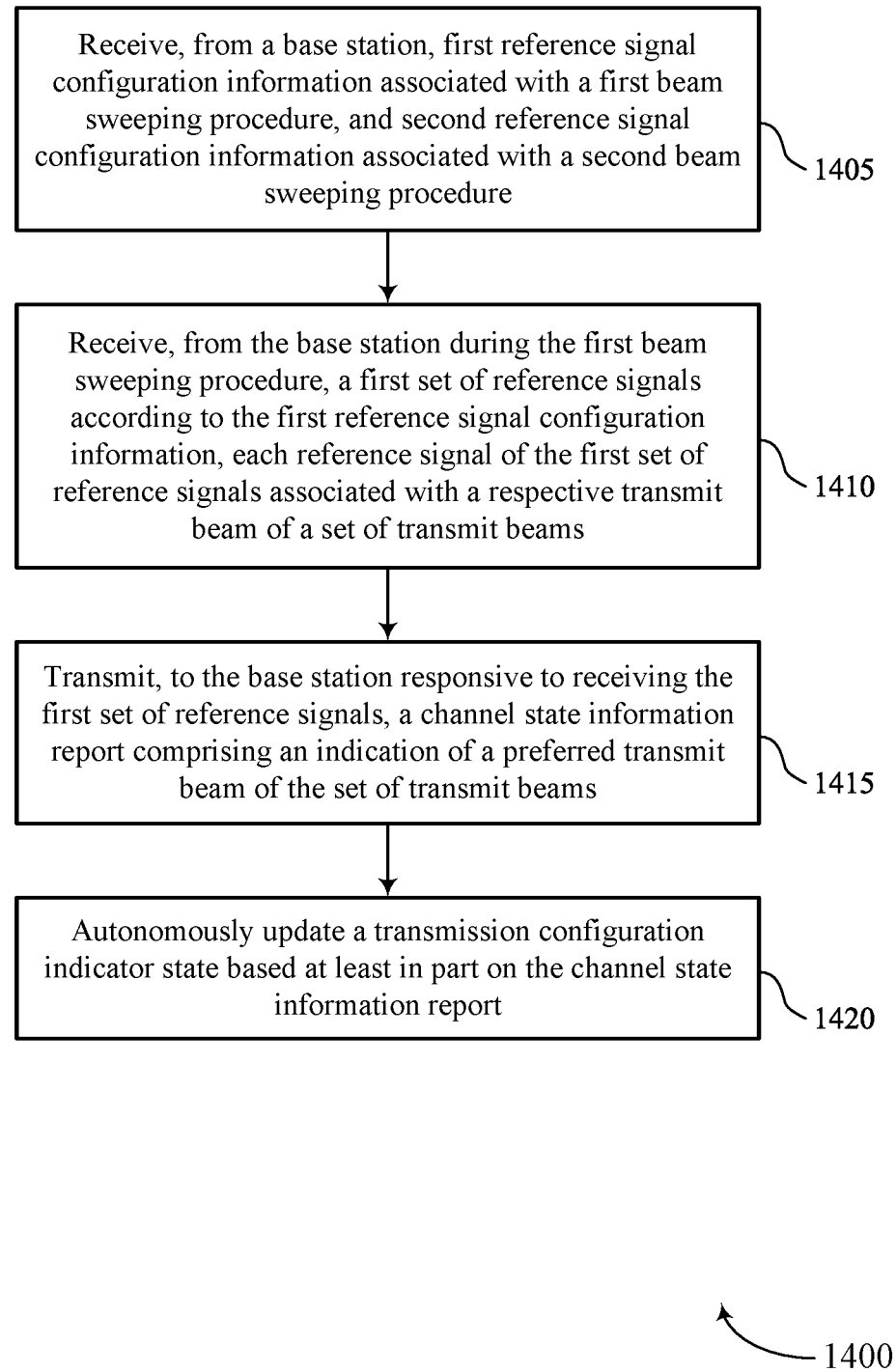
FIGS. 14 through 17 show flowcharts illustrating methods that support combined beam sweeping procedure in accordance with aspects of the present disclosure.

FIG. 14 shows a flowchart illustrating a method 1400 that supports combined beam sweeping procedure in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, first reference signal configuration information associated with a first beam sweeping procedure, and second reference signal configuration information associated with a second beam sweeping procedure. The operations of 1405 may be performed in accordance with examples as disclosed herein. In some examples, aspects of the operations of 1405 may be performed by a reference signal configuration information manager 825 as described with reference to FIG. 8.

At 1410, the method may include receiving, from the base station during the first beam sweeping procedure, a first set of reference signals according to the first reference signal configuration information, each reference signal of the first set of reference signals associated with a respective transmit beam of a set of transmit beams. The operations of 1410 may be performed in accordance with examples as disclosed herein. In some examples, aspects of the operations of 1410 may be performed by a reference signal manager 830 as described with reference to FIG. 8.

At 1415, the method may include transmitting, to the base station responsive to receiving the first set of reference signals, a channel state information report including an indication of a preferred transmit beam of the set of transmit beams. The operations of 1415 may be performed in accordance with examples as disclosed herein. In some examples, aspects of the operations of 1415 may be performed by a CSI report manager 835 as described with reference to FIG. 8.

At 1420, the method may include autonomously updating a transmission configuration indicator state based on the channel state information report. The operations of 1420 may be performed in accordance with examples as disclosed herein. In some examples, aspects of the operations of 1420 may be performed by a TCI state manager 840 as described with reference to FIG. 8.

Figure 15:
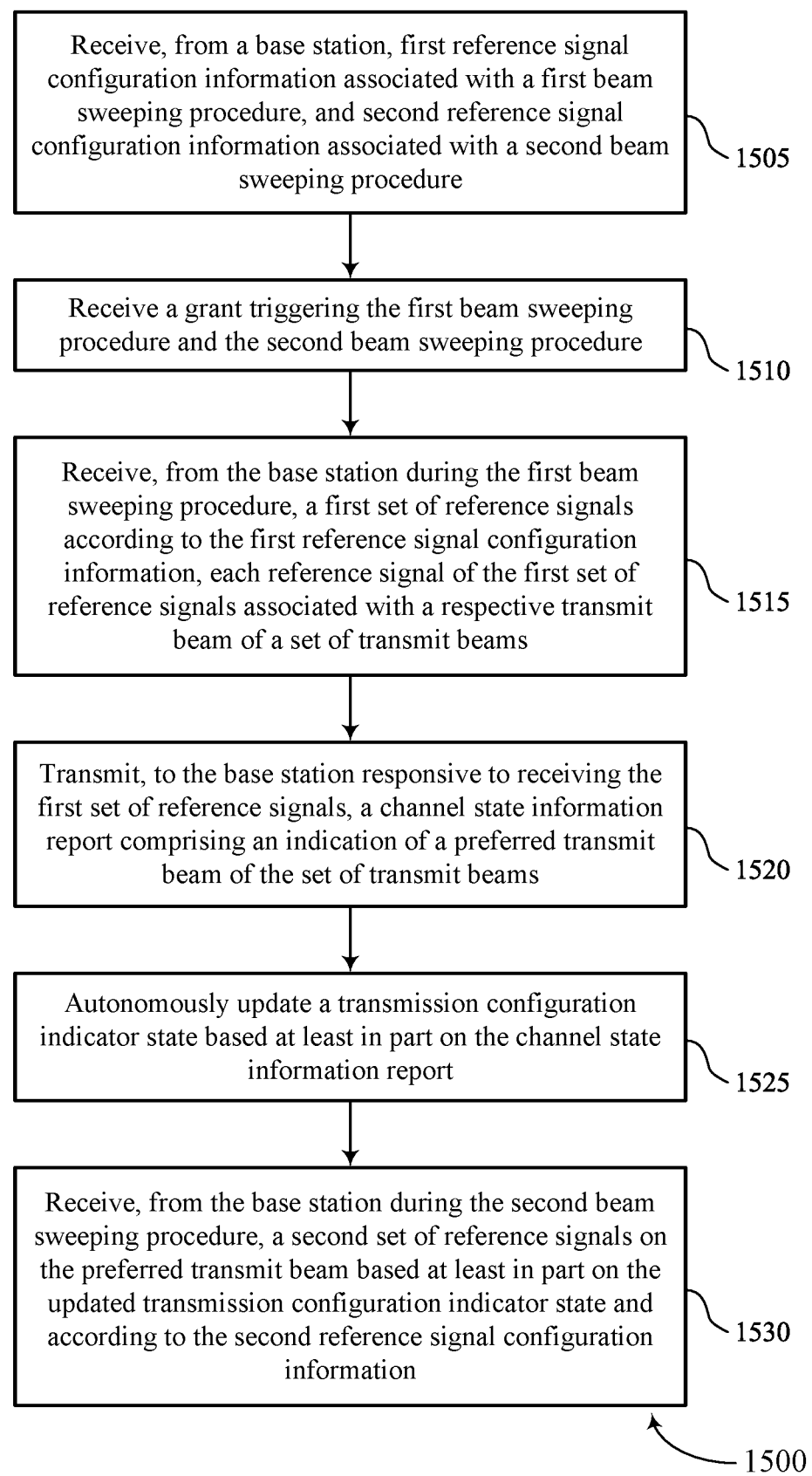

FIG. 15 shows a flowchart illustrating a method 1500 that supports combined beam sweeping procedure in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, first reference signal configuration information associated with a first beam sweeping procedure, and second reference signal configuration information associated with a second beam sweeping procedure. The operations of 1505 may be performed in accordance with examples as disclosed herein. In some examples, aspects of the operations of 1505 may be performed by a reference signal configuration information manager 825 as described with reference to FIG. 8.

At 1510, the method may include receiving a grant triggering the first beam sweeping procedure and the second beam sweeping procedure. The operations of 1510 may be performed in accordance with examples as disclosed herein. In some examples, aspects of the operations of 1510 may be performed by a grant manager 850 as described with reference to FIG. 8.

At 1515, the method may include receiving, from the base station during the first beam sweeping procedure, a first set of reference signals according to the first reference signal configuration information, each reference signal of the first set of reference signals associated with a respective transmit beam of a set of transmit beams. The operations of 1515 may be performed in accordance with examples as disclosed herein. In some examples, aspects of the operations of 1515 may be performed by a reference signal manager 830 as described with reference to FIG. 8.

At 1520, the method may include transmitting, to the base station responsive to receiving the first set of reference signals, a channel state information report including an indication of a preferred transmit beam of the set of transmit beams. The operations of 1520 may be performed in accordance with examples as disclosed herein. In some examples, aspects of the operations of 1520 may be performed by a CSI report manager 835 as described with reference to FIG. 8.

At 1525, the method may include autonomously updating a transmission configuration indicator state based on the channel state information report. The operations of 1525 may be performed in accordance with examples as disclosed herein. In some examples, aspects of the operations of 1525 may be performed by a TCI state manager 840 as described with reference to FIG. 8.

At 1530, the method may include receiving, from the base station during the second beam sweeping procedure, a second set of reference signals on the preferred transmit beam based on the updated transmission configuration indicator state and according to the second reference signal configuration information. The operations of 1530 may be performed in accordance with examples as disclosed herein. In some examples, aspects of the operations of 1530 may be performed by a reference signal manager 830 as described with reference to FIG. 8.

Figure 16:
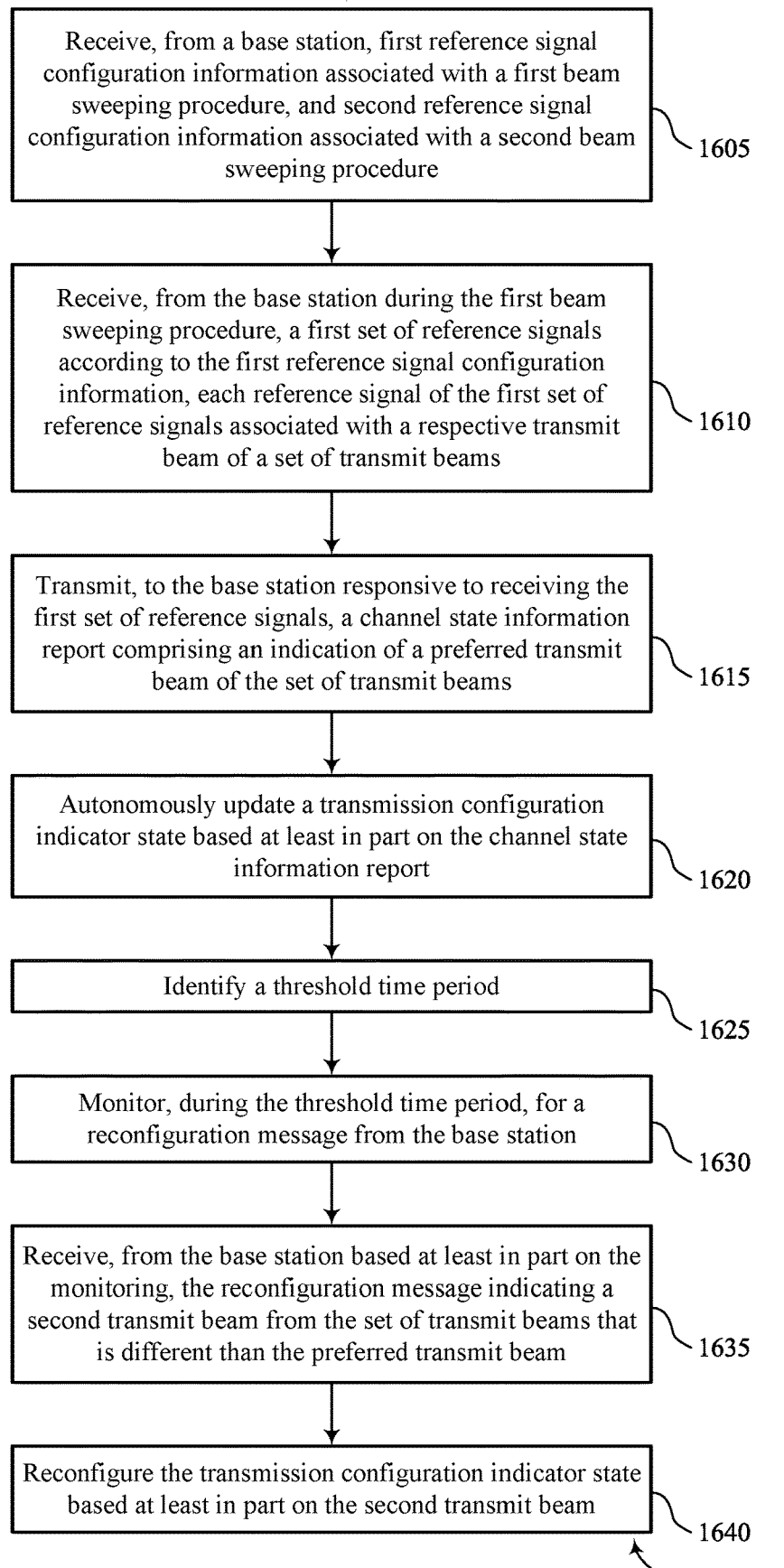

FIG. 16 shows a flowchart illustrating a method 1600 that supports combined beam sweeping procedure in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions.

Additionally, or alternatively, the UE may perform aspects of the described functions using special-purpose hardware.

At 1605, the method may include receiving, from a base station, first reference signal configuration information associated with a first beam sweeping procedure, and second reference signal configuration information associated with a second beam sweeping procedure. The operations of 1605 may be performed in accordance with examples as disclosed herein. In some examples, aspects of the operations of 1605 may be performed by a reference signal configuration information manager 825 as described with reference to FIG. 8.

At 1610, the method may include receiving, from the base station during the first beam sweeping procedure, a first set of reference signals according to the first reference signal configuration information, each reference signal of the first set of reference signals associated with a respective transmit beam of a set of transmit beams. The operations of 1610 may be performed in accordance with examples as disclosed herein. In some examples, aspects of the operations of 1610 may be performed by a reference signal manager 830 as described with reference to FIG. 8.

At 1615, the method may include transmitting, to the base station responsive to receiving the first set of reference signals, a channel state information report including an indication of a preferred transmit beam of the set of transmit beams. The operations of 1615 may be performed in accordance with examples as disclosed herein. In some examples, aspects of the operations of 1615 may be performed by a CSI report manager 835 as described with reference to FIG. 8.

At 1620, the method may include autonomously updating a transmission configuration indicator state based on the channel state information report. The operations of 1620 may be performed in accordance with examples as disclosed herein. In some examples, aspects of the operations of 1620 may be performed by a TCI state manager 840 as described with reference to FIG. 8.

At 1625, the method may include identifying a threshold time period. The operations of 1625 may be performed in accordance with examples as disclosed herein. In some examples, aspects of the operations of 1625 may be performed by a threshold time period manager 855 as described with reference to FIG. 8.

At 1630, the method may include monitoring, during the threshold time period, for a reconfiguration message from the base station. The operations of 1630 may be performed in accordance with examples as disclosed herein. In some examples, aspects of the operations of 1630 may be performed by a reconfiguration message manager 860 as described with reference to FIG. 8.

At 1635, the method may include receiving, from the base station based on the monitoring, the reconfiguration message indicating a second transmit beam from the set of transmit beams that is different than the preferred transmit beam. The operations of 1635 may be performed in accordance with examples as disclosed herein. In some examples, aspects of the operations of 1635 may be performed by a reconfiguration message manager 860 as described with reference to FIG. 8.

At 1640, the method may include reconfiguring the transmission configuration indicator state based on the second transmit beam. The operations of 1640 may be performed in accordance with examples as disclosed herein. In some examples, aspects of the operations of 1640 may be performed by a TCI state manager 840 as described with reference to FIG. 8.

Figure 17:
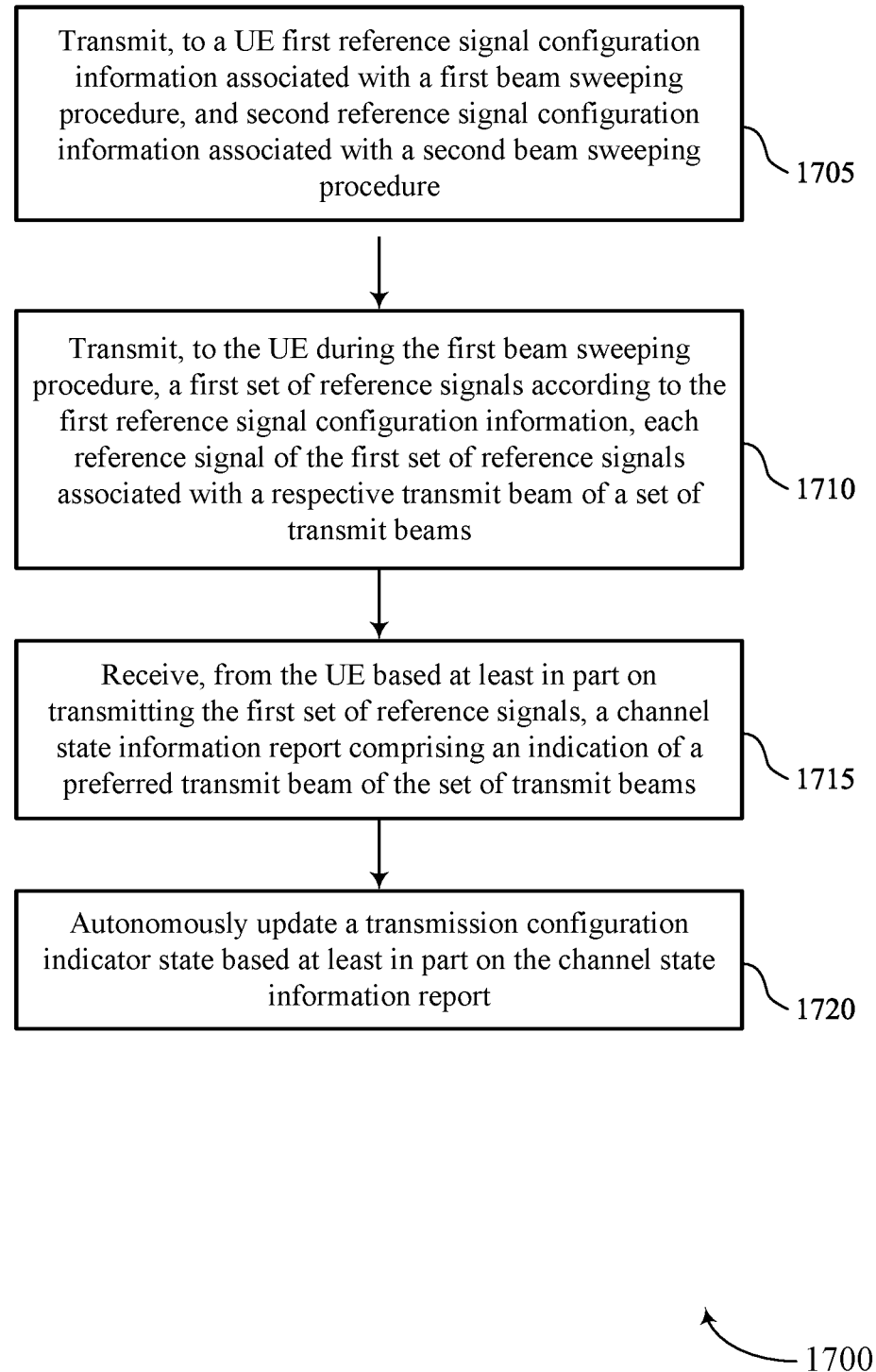

FIG. 17 shows a flowchart illustrating a method 1700 that supports combined beam sweeping procedure in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE first reference signal configuration information associated with a first beam sweeping procedure, and second reference signal configuration information associated with a second beam sweeping procedure. The operations of 1705 may be performed in accordance with examples as disclosed herein. In some examples, aspects of the operations of 1705 may be performed by a reference signal configuration information manager 1225 as described with reference to FIG. 12.

At 1710, the method may include transmitting, to the UE during the first beam sweeping procedure, a first set of reference signals according to the first reference signal configuration information, each reference signal of the first set of reference signals associated with a respective transmit beam of a set of transmit beams. The operations of 1710 may be performed in accordance with examples as disclosed herein. In some examples, aspects of the operations of 1710 may be performed by a reference signal manager 1230 as described with reference to FIG. 12.

At 1715, the method may include receiving, from the UE based on transmitting the first set of reference signals, a channel state information report including an indication of a preferred transmit beam of the set of transmit beams. The operations of 1715 may be performed in accordance with examples as disclosed herein. In some examples, aspects of the operations of 1715 may be performed by a CSI report manager 1235 as described with reference to FIG. 12.

At 1720, the method may include autonomously updating a transmission configuration indicator state based on the channel state information report. The operations of 1720 may be performed in accordance with examples as disclosed herein. In some examples, aspects of the operations of 1720 may be performed by a TCI state manager 1240 as described with reference to FIG. 12.

The following aspects are given by way of illustration. Examples of the following aspects may be combined with examples or embodiments shown or discussed in relation to the figures or elsewhere herein.

The following provides an overview of aspects of the present disclosure:

Aspect 1: A method for wireless communications at a UE, comprising: receiving, from a base station, first reference signal configuration information associated with a first beam sweeping procedure, and second reference signal configuration information associated with a second beam sweeping procedure; receiving, from the base station during the first beam sweeping procedure, a first set of reference signals according to the first reference signal configuration information, each reference signal of the first set of reference signals associated with a respective transmit beam of a set of transmit beams; transmitting, to the base station responsive to receiving the first set of reference signals, a channel state information report comprising an indication of a preferred transmit beam of the set of transmit beams; and autonomously updating a transmission configuration indicator state based at least in part on the channel state information report.

Aspect 2: The method of aspect 1, wherein autonomously updating the transmission configuration indicator state comprises: selecting the preferred transmit beam of the set of transmit beams; and configuring one or more antenna ports for receiving downlink signaling on the preferred transmit beam.

Aspect 3: The method of aspect 2, further comprising: identifying a threshold time period; and determining that the threshold time period is satisfied, wherein selecting the preferred transmit beam of the set of transmit beams is based at least in part on determining that the threshold time period is satisfied.

Aspect 4: The method of any of aspects 1 through 3, further comprising: receiving, from the base station during the second beam sweeping procedure, a second set of reference signals on the preferred transmit beam based at least in part on the updated transmission configuration indicator state and according to the second reference signal configuration information.

Aspect 5: The method of aspect 4, wherein receiving the second set of reference signals comprises: receiving the second set of reference signals on a set of receive beams, each reference signal of the second set of reference signals associated with a respective receive beam of the set of receive beams.

Aspect 6: The method of aspect 5, further comprising: selecting, based at least in part on receiving the second set of reference signals on the set of receive beams, a preferred receive beam of the set of receive beams.

Aspect 7: The method of any of aspects 1 through 6, further comprising: receiving a grant triggering the first beam sweeping procedure and the second beam sweeping procedure.

Aspect 8: The method of aspect 7, wherein the grant further triggers the channel state information report.

Aspect 9: The method of any of aspects 1 through 8, further comprising: identifying a threshold time period; monitoring, during the threshold time period, for a reconfiguration message from the base station; receiving, from the base station based at least in part on the monitoring, the reconfiguration message indicating a second transmit beam from the set of transmit beams that is different than the preferred transmit beam; and reconfiguring the transmission configuration indicator state based at least in part on the second transmit beam.

Aspect 10: The method of aspect 9, further comprising: receiving, from the base station during the second beam sweeping procedure, a second set of reference signals on the second transmit beam based at least in part on the reconfigured transmission configuration indicator state and according to the second reference signal configuration information.

Aspect 11: The method of any of aspects 1 through 10, wherein receiving the first reference signal configuration information and the second reference signal configuration information comprises: receiving a single control message comprising both the first reference signal configuration information and the second reference signal configuration information.

Aspect 12: The method of any of aspects 1 through 11, wherein receiving the first reference signal configuration information and the second reference signal configuration information comprises: receiving a first control message comprising the first reference signal configuration information; and receiving a second control message comprising the second reference signal configuration information.

Aspect 13: A method for wireless communications at a base station, comprising: transmitting, to a UE first reference signal configuration information associated with a first beam sweeping procedure, and second reference signal configuration information associated with a second beam sweeping procedure; transmitting, to the UE during the first beam sweeping procedure, a first set of reference signals according to the first reference signal configuration information, each reference signal of the first set of reference signals associated with a respective transmit beam of a set of transmit beams; receiving, from the UE based at least in part on transmitting the first set of reference signals, a channel state information report comprising an indication of a preferred transmit beam of the set of transmit beams; and autonomously updating a transmission configuration indicator state based at least in part on the channel state information report.

Aspect 14: The method of aspect 13, wherein autonomously updating the transmission configuration indicator state comprises: selecting the preferred transmit beam of the set of transmit beams; and configuring one or more antenna ports for transmitting downlink signaling on the preferred transmit beam.

Aspect 15: The method of any of aspects 13 through 14, further comprising: transmitting, to the UE during the second beam sweeping procedure, a second set of reference signals on the preferred transmit beam based at least in part on the updated transmission configuration indicator state and according to the second reference signal configuration information.

Aspect 16: The method of aspect 15, wherein transmitting the second set of reference signals comprises: transmitting each reference signal of the second set of reference signals at a different time, each reference signal of the second set of reference signals associated with a respective receive beam of a set of receive beams.

Aspect 17: The method of any of aspects 13 through 16, further comprising: transmitting a grant triggering the first beam sweeping procedure and the second beam sweeping procedure.

Aspect 18: The method of aspect 17, wherein the grant further triggers the channel state information report.

Aspect 19: The method of any of aspects 13 through 18, further comprising: identifying a threshold time period; transmitting, to the UE during the threshold time period, a reconfiguration message indicating a second transmit beam from the set of transmit beams that is different than the preferred transmit beam; and reconfiguring the transmission configuration indicator state based at least in part on the second transmit beam.

Aspect 20: The method of aspect 19, further comprising: transmitting, to the UE during the second beam sweeping procedure, a second set of reference signals on the second transmit beam based at least in part on the reconfigured transmission configuration indicator state and according to the second reference signal configuration information.

Aspect 21: The method of any of aspects 13 through 20, wherein transmitting the first reference signal configuration information and the second reference signal configuration information comprises: transmitting a single control message comprising both the first reference signal configuration information and the second reference signal configuration information.

Aspect 22: The method of any of aspects 13 through 21, wherein transmitting the first reference signal configuration information and the second reference signal configuration information comprises: transmitting a first control message comprising the first reference signal configuration information; and transmitting a second control message comprising the second reference signal configuration information.

Aspect 23: An apparatus for wireless communications at a UE, comprising a processor; memory coupled with the processor; and instructions stored in the memory and executable by the processor to cause the apparatus to perform a method of any of aspects 1 through 12.

Aspect 24: An apparatus for wireless communications at a UE, comprising at least one means for performing a method of any of aspects 1 through 12.

Aspect 25: A non-transitory computer-readable medium storing code for wireless communications at a UE, the code comprising instructions executable by a processor to perform a method of any of aspects 1 through 12.

Aspect 26: An apparatus for wireless communications at a base station, comprising a processor; memory coupled with the processor; and instructions stored in the memory and executable by the processor to cause the apparatus to perform a method of any of aspects 13 through 22.

Aspect 27: An apparatus for wireless communications at a base station, comprising at least one means for performing a method of any of aspects 13 through 22.

Aspect 28: A non-transitory computer-readable medium storing code for wireless communications at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   one or more processor-readable instructions stored in the one or more memories and executable by the one or more processors to cause the apparatus to:
      receive, from a base station, first reference signal configuration information associated with a first beam sweeping procedure, and second reference signal configuration information associated with a second beam sweeping procedure;
      receive, from the base station during the first beam sweeping procedure, a first set of reference signals according to the first reference signal configuration information, each reference signal of the first set of reference signals associated with a respective transmit beam of a set of transmit beams;
      transmit, to the base station responsive to receiving the first set of reference signals, a channel state information report comprising an indication of a preferred transmit beam of the set of transmit beams; and
      autonomously update a transmission configuration indicator state based at least in part on the channel state information report.

2. The apparatus of claim 1, wherein the one or more processor-readable instructions to autonomously update the transmission configuration indicator state are executable by the one or more processors to cause the apparatus to:
   select the preferred transmit beam of the set of transmit beams; and
   configure one or more antenna ports for receiving downlink signaling on the preferred transmit beam.

3. The apparatus of claim 2, wherein the one or more processor-readable instructions are further executable by the one or more processors to cause the apparatus to:
   identify a threshold time period; and
   determine that the threshold time period is satisfied, wherein selecting the preferred transmit beam of the set of transmit beams is based at least in part on determining that the threshold time period is satisfied.

4. The apparatus of claim 1, wherein the one or more processor-readable instructions are further executable by the one or more processors to cause the apparatus to:
   receive, from the base station during the second beam sweeping procedure, a second set of reference signals on the preferred transmit beam based at least in part on the updated transmission configuration indicator state and according to the second reference signal configuration information.

5. The apparatus of claim 4, wherein the one or more processor-readable instructions to receive the second set of reference signals are executable by the one or more processors to cause the apparatus to:
   receive the second set of reference signals on a set of receive beams, each reference signal of the second set of reference signals associated with a respective receive beam of the set of receive beams.

6. The apparatus of claim 5, wherein the one or more processor-readable instructions are further executable by the one or more processors to cause the apparatus to:
   select, based at least in part on receiving the second set of reference signals on the set of receive beams, a preferred receive beam of the set of receive beams.

7. The apparatus of claim 1, wherein the one or more processor-readable instructions are further executable by the one or more processors to cause the apparatus to:
   receive a grant triggering the first beam sweeping procedure and the second beam sweeping procedure, wherein the grant triggers the channel state information report.

8. The apparatus of claim 1, wherein the one or more processor-readable instructions are further executable by the one or more processors to cause the apparatus to:
   identify a threshold time period;
   monitor, during the threshold time period, for a reconfiguration message from the base station;
   receive, from the base station based at least in part on the monitoring, the reconfiguration message indicating a second transmit beam from the set of transmit beams that is different than the preferred transmit beam;
   reconfigure the transmission configuration indicator state based at least in part on the second transmit beam; and
   receive, from the base station during the second beam sweeping procedure, a second set of reference signals on the second transmit beam based at least in part on the reconfigured transmission configuration indicator state and according to the second reference signal configuration information.

9. The apparatus of claim 1, wherein the one or more processor-readable instructions to receive the first reference signal configuration information and the second reference signal configuration information are executable by the one or more processors to cause the apparatus to:
   receive a single control message comprising both the first reference signal configuration information and the second reference signal configuration information.

10. The apparatus of claim 1, wherein the one or more processor-readable instructions to receive the first reference signal configuration information and the second reference signal configuration information are executable by the one or more processors to cause the apparatus to:
    receive a first control message comprising the first reference signal configuration information; and
    receive a second control message comprising the second reference signal configuration information.

11. An apparatus for wireless communications at a base station, comprising:
    one or more processors;
    one or more memories coupled with the one or more processors; and one or more processor-readable instructions stored in the one or more memories and executable by the one or more processors to cause the apparatus to:
  transmit, to a user equipment (UE), first reference signal configuration information associated with a first beam sweeping procedure, and second reference signal configuration information associated with a second beam sweeping procedure;
  transmit, to the UE during the first beam sweeping procedure, a first set of reference signals according to the first reference signal configuration information, each reference signal of the first set of reference signals associated with a respective transmit beam of a set of transmit beams;
  receive, from the UE based at least in part on transmitting the first set of reference signals, a channel state information report comprising an indication of a preferred transmit beam of the set of transmit beams; and
  autonomously update a transmission configuration indicator state based at least in part on the channel state information report.

12. The apparatus of claim 11, wherein the one or more processor-readable instructions to autonomously update the transmission configuration indicator state are executable by the one or more processors to cause the apparatus to:
  select the preferred transmit beam of the set of transmit beams; and
  configure one or more antenna ports for transmitting downlink signaling on the preferred transmit beam.

13. The apparatus of claim 11, wherein the one or more processor-readable instructions are further executable by the one or more processors to cause the apparatus to:
  transmit, to the UE during the second beam sweeping procedure, a second set of reference signals on the preferred transmit beam based at least in part on the updated transmission configuration indicator state and according to the second reference signal configuration information.

14. The apparatus of claim 13, wherein the one or more processor-readable instructions to transmit the second set of reference signals are executable by the one or more processors to cause the apparatus to:
  transmit each reference signal of the second set of reference signals at a different time, each reference signal of the second set of reference signals associated with a respective receive beam of a set of receive beams.

15. The apparatus of claim 11, wherein the one or more processor-readable instructions are further executable by the one or more processors to cause the apparatus to:
  transmit a grant triggering the first beam sweeping procedure and the second beam sweeping procedure, wherein the grant further triggers the channel state information report.

16. The apparatus of claim 11, wherein the one or more processor-readable instructions are further executable by the one or more processors to cause the apparatus to:
  identify a threshold time period;
  transmit, to the UE during the threshold time period, a reconfiguration message indicating a second transmit beam from the set of transmit beams that is different than the preferred transmit beam;
  reconfigure the transmission configuration indicator state based at least in part on the second transmit beam; and
  transmit, to the UE during the second beam sweeping procedure, a second set of reference signals on the second transmit beam based at least in part on the reconfigured transmission configuration indicator state and according to the second reference signal configuration information.

17. The apparatus of claim 11, wherein the one or more processor-readable instructions to transmit the first reference signal configuration information and the second reference signal configuration information are executable by the one or more processors to cause the apparatus to:
  transmit a single control message comprising both the first reference signal configuration information and the second reference signal configuration information.

18. The apparatus of claim 11, wherein the one or more processor-readable instructions to transmit the first reference signal configuration information and the second reference signal configuration information are executable by the one or more processors to cause the apparatus to:
  transmit a first control message comprising the first reference signal configuration information; and
  transmit a second control message comprising the second reference signal configuration information.

19. A method for wireless communications at a user equipment (UE), comprising:
  receiving, from a base station, first reference signal configuration information associated with a first beam sweeping procedure, and second reference signal configuration information associated with a second beam sweeping procedure;
  receiving, from the base station during the first beam sweeping procedure, a first set of reference signals according to the first reference signal configuration information, each reference signal of the first set of reference signals associated with a respective transmit beam of a set of transmit beams;
  transmitting, to the base station responsive to receiving the first set of reference signals, a channel state information report comprising an indication of a preferred transmit beam of the set of transmit beams; and
  autonomously updating a transmission configuration indicator state based at least in part on the channel state information report.

20. The method of claim 19, wherein autonomously updating the transmission configuration indicator state comprises:
  selecting the preferred transmit beam of the set of transmit beams; and
  configuring one or more antenna ports for receiving downlink signaling on the preferred transmit beam.

21. The method of claim 19, further comprising:
  receiving, from the base station during the second beam sweeping procedure, a second set of reference signals on the preferred transmit beam based at least in part on the updated transmission configuration indicator state and according to the second reference signal configuration information.

22. The method of claim 19, further comprising:
  receiving a grant triggering the first beam sweeping procedure and the second beam sweeping procedure, wherein the grant further triggers the channel state information report.

23. The method of claim 19, further comprising:
  identifying a threshold time period;
  monitoring, during the threshold time period, for a reconfiguration message from the base station;
  receiving, from the base station based at least in part on the monitoring, the reconfiguration message indicating a second transmit beam from the set of transmit beams that is different than the preferred transmit beam;

reconfiguring the transmission configuration indicator state based at least in part on the second transmit beam; and receiving, from the base station during the second beam sweeping procedure, a second set of reference signals on the second transmit beam based at least in part on the reconfigured transmission configuration indicator state and according to the second reference signal configuration information.

24. The method of claim 19, wherein receiving the first reference signal configuration information and the second reference signal configuration information comprises:

receiving a single control message comprising both the first reference signal configuration information and the second reference signal configuration information.

25. A method for wireless communications at a base station, comprising:

transmitting, to a user equipment (UE), first reference signal configuration information associated with a first beam sweeping procedure, and second reference signal configuration information associated with a second beam sweeping procedure;

transmitting, to the UE during the first beam sweeping procedure, a first set of reference signals according to the first reference signal configuration information, each reference signal of the first set of reference signals associated with a respective transmit beam of a set of transmit beams;

receiving, from the UE based at least in part on transmitting the first set of reference signals, a channel state information report comprising an indication of a preferred transmit beam of the set of transmit beams; and autonomously updating a transmission configuration indicator state based at least in part on the channel state information report.

26. The method of claim 25, wherein autonomously updating the transmission configuration indicator state comprises:

selecting the preferred transmit beam of the set of transmit beams; and configuring one or more antenna ports for transmitting downlink signaling on the preferred transmit beam.

27. The method of claim 25, further comprising:

transmitting, to the UE during the second beam sweeping procedure, a second set of reference signals on the preferred transmit beam based at least in part on the updated transmission configuration indicator state and according to the second reference signal configuration information.

28. The method of claim 25, further comprising:

transmitting a grant triggering the first beam sweeping procedure and the second beam sweeping procedure, wherein the grant further triggers the channel state information report.

29. The method of claim 25, further comprising:

identifying a threshold time period;

transmitting, to the UE during the threshold time period, a reconfiguration message indicating a second transmit beam from the set of transmit beams that is different than the preferred transmit beam; and reconfiguring the transmission configuration indicator state based at least in part on the second transmit beam.

30. The method of claim 29, further comprising:

transmitting, to the UE during the second beam sweeping procedure, a second set of reference signals on the second transmit beam based at least in part on the reconfigured transmission configuration indicator state and according to the second reference signal configuration information.

* * * * *